(12) United States Patent  
Sarata et al.

(10) Patent No.: US 8,338,045 B2  
(45) Date of Patent: Dec. 25, 2012

(54) FUEL CELL SYSTEM CONTROLLED IN ACCORDANCE WITH DRIVE CONDITION OF FUEL CELL

(75) Inventors: Takafumi Sarata, Chiba (JP); Tuneaki Tamachi, Chiba (JP); Norimasa Yanase, Chiba (JP); Kazuyoshi Furuta, Chiba (JP); Fumiharu Iwasaki, Chiba (JP)

(73) Assignee: Seiko Instruments Inc. (JP)

( * ) Notice: Subject to any disclaimer, the term of this patent is extended or adjusted under 35 U.S.C. 154(b) by 1195 days.

(21) Appl. No.: 10/546,662

(22) PCT Filed: Feb. 23, 2004

(86) PCT No.: PCT/JP2004/002077  
§ 371 (c)(1),  
(2), (4) Date: Dec. 5, 2005

(87) PCT Pub. No.: WO2004/075329  
PCT Pub. Date: Sep. 2, 2004

(65) Prior Publication Data  
US 2006/0147776 A1    Jul. 6, 2006

(30) Foreign Application Priority Data

Feb. 24, 2003  (JP) ................. 2003-045897  
Feb. 10, 2004  (JP) ................. 2004-033141

(51) Int. Cl.  
*H01M 8/04*    (2006.01)  
*H01M 8/06*    (2006.01)  
*B01J 7/00*    (2006.01)

(52) U.S. Cl. ............. 429/444; 429/416; 429/513; 48/61

(58) Field of Classification Search .......... 429/408–427, 429/443–449, 512–516; 48/61  
See application file for complete search history.

(56) References Cited

U.S. PATENT DOCUMENTS

| | | | | |
|---|---|---|---|---|
| 3,098,769 | A * | 7/1963 | Liebbafsky et al. | 429/19 |
| 3,594,232 | A * | 7/1971 | Spahrbier | 429/19 |
| 4,155,712 | A * | 5/1979 | Taschek | 422/239 |
| 5,593,640 | A * | 1/1997 | Long et al. | 422/111 |
| 5,976,725 | A * | 11/1999 | Gamo et al. | 429/25 |
| 6,274,093 | B1 * | 8/2001 | Long et al. | 422/129 |
| 6,939,529 | B2 * | 9/2005 | Strizki et al. | 423/658.2 |
| 7,344,571 | B2 * | 3/2008 | Bae et al. | 48/61 |
| 2002/0182459 | A1 | 12/2002 | Hockaday | |

FOREIGN PATENT DOCUMENTS

| | | |
|---|---|---|
| DE | 10155171 | 6/2002 |
| JP | 01208301 A * | 8/1989 |
| WO | WO 01/85606 A1 | 11/2001 |

* cited by examiner

*Primary Examiner* — Barbara Gilliam  
*Assistant Examiner* — Edu E Enin-Okut  
(74) *Attorney, Agent, or Firm* — Adams & Wilks

(57) ABSTRACT

A fuel cell system supplies a reacting solution from a liquid storage section to a reaction section to generate a reacting gas. A gas storage section stores the reacting gas and supplies it to a solid polymer membrane fuel cell which generates electricity using the reacting gas as fuel. The reacting solution is supplied from the liquid storage section to the reaction section when the pressure in the liquid storage section is higher than the pressure in the reaction section and the supply of reacting solution is stopped when the pressure in the liquid storage section is lower than the pressure in the reaction section. In this manner, the supply volume of the reacting solution is controlled in accordance with the driving state of the fuel cell.

27 Claims, 13 Drawing Sheets

(A) AT THE TIME OF STOPPAGE (B) AT THE TIME OF MOVEMENT (A) AT THE TIME OF STOPPAGE OF MOVEMENT OF REACTING SOLUTION (B) AT THE TIME OF MOVEMENT OF REACTING SOLUTION (A) AT THE TIME OF STOPPAGE OF MOVEMENT OF REACTING SOLUTION (B) AT THE TIME OF MOVEMENT OF REACTING SOLUTION (A) AT THE TIME OF STOPPAGE OF MOVEMENT OF REACTING SOLUTION (B) AT THE TIME OF MOVEMENT OF REACTING SOLUTION TO REACTING SECTION (A) AT THE TIME OF STOPPAGE OF MOVEMENT OF REACTING SOLUTION (B) AT THE TIME OF MOVEMENT OF REACTING SOLUTION TO REACTING SECTION (A) AT THE TIME OF STOPPAGE OF HYDROGEN GENERATING REACTION (B) AT THE TIME OF GENERATION OF HYDROGEN (A) AT THE TIME OF STOPPAGE OF HYDROGEN GENERATING REACTION (B) AT THE TIME OF GENERATION OF HYDROGEN

FUEL CELL SYSTEM CONTROLLED IN ACCORDANCE WITH DRIVE CONDITION OF FUEL CELL

CROSS REFERENCE TO RELATED APPLICATIONS

This application is a U.S. national stage application of copending International Application No. PCT/JP2004/002077, filed Feb. 23, 2004, claiming priority dates of Feb. 24, 2003 and Feb. 10, 2004, and published in a non-English language.

FIELD OF THE INVENTION

The present invention relates to a fuel cell system for supplying hydrogen and oxygen so as to drive a solid polymer type fuel cell.

BACKGROUND ART

Recently, importance has been attached to solve energy and environmental problems. Therefore, it is demanded to provide an electric power source of high energy density, the emission matter of which is clean. The fuel cell is a generator, the energy density of which is several times as high as that of the conventional battery. The energy efficiency of the fuel cell is high. Further, the exhaust gas discharged from the fuel cell contains no nitrogen oxide and sulfur oxide. Alternatively, the exhaust gas discharged from the fuel cell seldom contains nitrogen oxide and sulfur oxide. Accordingly, it is said that the fuel cell is a very effective device which meets the demand for an electric power source device of the next generation. Especially, the solid polymer type fuel cell has a good starting characteristic because it can be driven even at low temperatures of not higher than 100° C. Therefore, the solid polymer type fuel cell has been actively developed so that it can be used as a stationary dispersion type power source, an automobile power source and a power source incorporated into a portable device.

The high molecular type fuel cell is a device operated in such a manner that the oxidization of hydrogen on the anode and the reduction of oxygen on the cathode are electrochemically conducted at the same time, and an electrical output can be obtained by an electric current taken out from a potential difference between the anode and cathode in the electrochemical reaction process. The conventional fuel cell includes: a fuel storage section for storing a reactant; a reacting section for reforming the reactant to fuel gas; a fuel supply passage; an anode or cathode for generating electricity by the electrochemical reaction of fuel; and an electrolyte for transmitting ions between the anode and cathode.

Examples of the anode side fuel conventionally used are: hydrogen, alcohol such as methanol or ethanol; ether; and chemical hydride such as cyclohexanol or sodium boron hydride. Except for hydrogen, all the fuel described above is used in the form of liquid and transformed into hydrogen gas by are forming device. Concerning the fuel cell, the developer's attention has been focused upon the selection of chemical substance which is effective for taking out hydrogen and suitable for transporting and storing the fuel. Attention is given to the fuel described above because the fuel is assumed to be effective for the fuel cell.

The reactant on the cathode side is an oxidant. The typical oxidant is oxygen. However, a peroxide such as hydrogen peroxide is used in some cases.

In order to drive a device, which consumes electric power, such as an electrical appliance, a portable device and an automobile by a fuel cell, it is necessary for the fuel cell to output electric power, the intensity of which corresponds to a load of the device which consumes electric power. An output of the fuel cell is a factor determined by a volume of the reacting gas to be supplied to the electrode such as hydrogen gas or oxygen gas. Accordingly, when an extremely large volume of the reacting gas exists in the periphery of the electrode, an output of the fuel cell can be changed responding to the load given to the fuel cell. From this viewpoint, when the reacting gas is appropriately supplied to the electrode before hydrogen and oxygen existing in the periphery of the electrode are used up, it is possible for the fuel cell to be operated responding to the load of the device which consumes electric power.

In this case, in order to supply a necessary volume of the reacting gas, it is necessary to obtain the necessary volume of the reacting gas from the above fuel and oxidant. Accordingly, an appropriate volume of fuel must be supplied from the fuel storage section to the reacting section. Further, an appropriate volume of oxidant must be supplied to the reacting section.

When the fuel, oxidant and reacting gas are supplied, it is conventional to use a pump or blower. The volumes to be supplied are controlled according to the output of the fuel cell and the load of the device which consumes electric power. Concerning this matter, for example, refer to Non-patent Document 1.

Non-patent Document 1: "Technical Tendency of Portable Type Fuel Cell" by Masahiro Ichimura, pages 2 to 4 and FIG. 3 in NTT Building Technology Institute 2003

However, in any of the anode and the cathode, it is difficult to control the volumes of fuel and reacting gas to be supplied to the electrode. In order to control the volumes of fuel and reacting gas, it is necessary to input energy, which is used for controlling, from the outside or the fuel cell itself into the control system. Accordingly, since energy is consumed for controlling as described above, the effective output of the fuel cell is decreased.

Further, in the case where hydrogen is used as the fuel on the anode side, when hydrogen is taken out by reforming the reactant, it is necessary to control a volume of the generated hydrogen according to a volume of hydrogen used on the anode. In order to control the volume of the generated hydrogen, it is necessary to control a reaction temperature and a volume of fuel to be supplied. Therefore, it is necessary to attach a temperature control system such as a heater, temperature sensor and controller to the reacting section and the electrode. Further, it is necessary to attach a valve and controller for controlling the volume of fuel to be supplied. Accordingly, energy is further consumed by the above control mechanism for controlling the reaction. Therefore, the effective output of the fuel cell is decreased.

At the same time, especially, in the case of a fuel cell applied to a small electronic device, a space, in which fuel is to be accommodated, is decreased by the volume in which the above system is arranged. Accordingly, the volume of this system is very disadvantageous in the volume energy density. By the volume of this system, the volume energy density of this fuel cell is lowered as compared with the volume energy density of the conventional battery.

In the case where the system of controlling a volume of the generated hydrogen is not provided, the inner pressure in the fuel cell is raised by the hydrogen generated exceeding a volume of hydrogen corresponding to an electric current to be outputted. In this case, the generated hydrogen cross-leaks to the cathode side through the solid high molecular electrolyte film, and an output of the cathode is lowered.

When the hydrogen leaks out as described above, it is impossible to effectively use the hydrogen. Therefore, the energy density is lowered.

Problems caused on the anode are described above, however, the same problems are also caused on the cathode. In the case where oxygen is generated from the oxidant and the thus generated oxygen is supplied to the cathode, it is necessary to control the volume of the generated oxygen according to the volume of the used oxygen. Energy is consumed for this control. Further, in order to arrange the controlling mechanism, the volume energy density is decreased.

It is an object of the present invention to decrease energy necessary for supplying appropriate volumes of fuel and oxidant to an electrode of a fuel cell so as to decrease a volume of the control mechanism for controlling a volume of the supply and also decrease a volume of the control mechanism for controlling a volume of the reaction. It is another object of the present invention to solve the above problems in the conventional art by providing a small fuel cell system, which is used for a portable device, characterized in that the energy density is advantageously high, the size of the fuel cell is small, the fuel cell can be safely operated and the fuel utilizing efficiency is high.

SUMMARY OF THE INVENTION

In order to solve the above problems, the present invention provide a fuel cell system comprising: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being used as fuel; and a reacting solution supply volume adjusting means for supplying the reacting solution from the liquid storage section to the reacting section in the case where the pressure in the liquid storage section is higher than the pressure in the reacting section and for stopping the supply of the reacting solution in the case where the pressure in the liquid storage section is lower than the pressure in the reacting section.

The action conducted by the above structure will be explained below. When the reacting gas is generated in the reacting section, the inner pressure in the reacting section and the gas storage section is raised. In this case, the reacting solution is not supplied to the reacting section by the reacting solution supply adjusting means. On the other hand, when the reacting gas is consumed by the fuel cell, the inner pressure in the reacting section and the gas storage section is lowered. In this case, the reacting solution is supplied to the reacting section by the reacting solution supply adjusting means.

A fuel cell system further comprises a pressure adjusting device for giving pressure to the liquid storage section in the case where the inner pressure of the liquid storage section is lowered by the supply of the reacting solution.

Due to the foregoing, even when the reacting solution is supplied from the liquid storage section to the reacting section, the inner pressure in the liquid storage section is quickly adjusted by the pressure adjusting device to a constant pressure.

The reacting solution supply volume adjusting means includes a check device which is arranged in a liquid supply passage for supplying the reacting gas from the liquid storage section to the reacting section, and the check device prevents the reacting solution from flowing backward or prevents the reacting gas from flowing in.

The action conducted in the above structure will be explained below. When the reacting gas is generated in the reacting section, the inner pressure in the reacting section and the gas storage section is raised. However, since the check device prevents the reacting gas from flowing into the liquid storage section, the inner pressure in the liquid storage section is not raised. Further, the inner pressure in the liquid storage section can be maintained constant by the pressure adjusting device. In this case, since the inner pressure in the reacting section is higher than that in the liquid storage section, supplying the reacting solution can be stopped. On the other hand, when the reacting gas is consumed by the fuel cell, the inner pressure in the reacting section and the gas storage section is lowered. Since the check device does not obstruct a flow of the reacting solution from the liquid storage section to the reacting section, when the inner pressure in the reacting section is decreased to be lower than the inner pressure of the liquid storage section, the reacting solution is supplied to the reacting section by the differential pressure.

A volume of the reacting solution to be supplied is determined by the output of the fuel cell. That is, the rate of consuming the reacting gas is changed according to the output of the fuel cell. When the rate of consuming the reacting gas is high, a period of time from the generation of the reacting gas to the supply of the reacting solution is shortened, and the reacting solution is supplied at a short time interval. On the contrary, when the rate of consuming the reacting gas is low, the frequency of supplying the reacting solution is reduced.

As described above, according to this structure, a volume of supplying the reacting solution can be controlled according to the state of driving the fuel cell without directly detecting the electric power outputted from the fuel cell. That is, no electrical control signals are used for the reacting solution supply control. Therefore, it become unnecessary to conduct electrical processing and provide electrical parts relating to electrical control. Accordingly, the energy consumption can be reduced, and further the number of parts can be decreased. Since the reacting solution can be supplied according to the state of driving the fuel cell, the fuel utilizing efficiency, which is a ratio of the fuel consumption to the supply of the reacting gas, can be increased.

In this case, the reacting gas is fuel, which is used for the fuel cell, such as hydrogen and oxygen, and oxidant. Examples of the combination of the reacting solution with the substance arranged in the reacting section are described as follows but not limited to the following. On the anode side, they are at least one of the groups including a group of alcohol such as methanol or ethanol, a group of ether, a group of chemical hydride such as metal hydride complex compound represented by cyclohexane and sodium boron hydride and a group of metals such as aluminum, magnesium, zinc, iron, nickel and tin, and at least one of the catalysts and the accelerator used for effectively extracting hydrogen. Either the former or the latter may be used in the reacting solution. It is preferable that the substance capable of being held as an aqueous solution or liquid is used as the reacting solution. An example of the catalyst and accelerator is one substance included in the group of platinum, gold, copper, nickel and iron with respect to a group of alcohol, a group of ether and a group of organic chemical hydride such as cyclohexane. With respect to inorganic chemical hydride, an example of the catalyst and accelerator is one metal in the group of platinum, gold, copper, nickel, iron, titanium and zirconium, and its salt and inorganic acid such as sulfuric acid or citric acid. With respect to aluminum and other metals, it is inorganic acid or an aqueous solution containing hydroxide ions.

On the cathode side, they are at least one of peroxides represented by hydrogen peroxide, and a catalyst used for effectively extracting oxygen from the above substance, for example, manganese dioxide.

A fuel cell system is characterized in that the check device opens and closes a liquid supply passage.

This structure is preferably composed in such a manner that when the pressure in the liquid storage section is higher than the pressure in the reacting section, the reacting solution is supplied from the liquid storage section to the reacting section and when the pressure in the liquid storage section is lower than the pressure in the reacting section, the supply of reacting solution is stopped.

Due to the foregoing, it is possible to eliminate the energy consumption relating to the driving of the check device. That is, no electric power is required for supplying the reacting solution. As a result, it becomes possible to enhance the output density and the energy density of the fuel cell system.

A fuel cell system is characterized in that the check device is a first check valve to obstruct a flow of substance from the reacting section to the liquid storage section.

Due to the foregoing, a small check device can be simply manufactured at a low manufacturing cost. Concerning the check valve, it is preferable to use a check valve of the type in which the check valve body is moved according to the direction of the substance flowing in the valve, because no electric power is consumed. Concerning the fuel cell used for a portable device, it is preferable that an intermediate chamber is not provided in the fuel cell, because the volume of the fuel cell can be reduced. Further, it is preferable that no ventilation hole is provided, because the reacting gas seldom leaks out from the fuel cell.

Concerning the structure of the check device different from the above, the check device is a first movable wall interposed between the liquid storage section and the reacting section, and when the pressure in the reacting section is raised by generation of the reacting gas, the movable wall is moved by a force generated by the pressure in the reacting section so that the liquid supply passage can be closed, and when the pressure in the reacting section is lowered by the consumption of the reacting gas, the movable wall is moved so that the liquid supply passage can be opened.

This structure is operated by a difference in pressure between the reacting section and the liquid storage section. A change in pressure in the reacting section is caused by the output of the fuel cell. Since the pressure in the liquid storage section is constant, the difference in pressure between the reacting section and the liquid storage section reflects a state of the operation of the fuel cell. Due to the foregoing, by the state of the operation of the fuel cell, a volume of the reacting solution can be automatically controlled without the consumption of electric power.

The fuel cell system is characterized in that the pressure adjusting device has a port from which an external substance is taken in, and the external substance is supplied from the port into the liquid storage section in one direction.

The action of the above structure will be explained below. When the inner pressure in the liquid storage section is lowered corresponding to a volume of supply of the reacting solution, a difference in pressure is generated between the liquid storage section and the outside of the fuel cell system. However, since the external substance flows into the liquid storage section according to the generation of the difference in pressure, the pressure in the liquid storage section is adjusted and made to be the same as the external pressure. Accordingly, the inner pressure in the liquid storage section can be maintained constant. Therefore, at the time of consuming the reacting gas, the pressure in the reacting section can be decreased lower than the inner pressure in the liquid storage section. Accordingly, it is possible to make a circumstance in which the reacting solution is supplied.

The external substance is not particularly limited to a specific substance. It is preferable that the external substance is the atmosphere, the water or the reacting solution. In the case of the atmosphere, the pressure in the liquid storage section can be adjusted to the atmospheric pressure, and the structure of the external substance taking port can be made to be a pipe or hole having such a structure that the substance in the liquid storage section does not flow outside the fuel cell. In the case of the water or the reacting solution, water or the reacting solution is arranged coming into contact with the external substance taking port. In this case, the water or the reacting solution flowing into the liquid storage section can be used for the reacting gas generating reaction. Therefore, the capacity can be enhanced.

Due to the foregoing, in the case where the reacting solution is moved from the liquid storage section, the pressure in the liquid storage section can be made constant by introducing the external substance, the volume of which corresponds to the volume of the moved reacting solution. As a result, it becomes possible to repeatedly supply the reacting solution from the liquid storage section to the reacting section.

Further, the fuel cell system is characterized in that the pressure adjusting device has a second check valve to obstruct a flow of the substance from the liquid storage section to the outside of the fuel cell.

Due to the foregoing, it becomes possible to provide a structure in which no electric power is consumed for the object of maintaining the inner pressure of the liquid storage section constant. Further, it becomes possible to prevent a decrease in the volume of liquid caused by the evaporation and flow-out of the liquid from the liquid storage section. Further, it is possible to simply manufacture a check device, the volume of which is small, at a low manufacturing cost.

Further, the fuel cell system is characterized in that the pressure adjusting device has a pump or fan to supply liquid or gas from the outside of the fuel cell.

Due to the foregoing, the pressure in the liquid storage section can be adjusted. However, it is necessary to consume electric power for driving a pump or fan. However, since a movement of the reacting solution for obtaining a volume of generation of the reacting gas used to stop the movement of the reacting solution is very small. Accordingly, a drive of the pump or fan is small. Therefore, the electric power consumption is small.

In this connection, in order to control to drive the pump or fan, a method is provided in which the pressure in the liquid storage section is detected and a difference in pressure between the thus detected pressure and the initial pressure is detected and the pump or fan is driven until the difference in pressure is eliminated.

When the pump or fan is controlled so that the pressure in the liquid storage section can be higher than a predetermined pressure, a volume of supply of the reacting solution is controlled so that the inner pressure in the reacting section and the gas storage section can be balanced to the inner pressure in the liquid storage section. As a result, a volume of generation of the reacting gas is increased. Accordingly, the pressure in the reacting section and the gas storage section can be raised high. Consequently, it becomes possible to enhance an output of the fuel cell of the present structure.

The fuel cell system is characterized in that a portion of the liquid storage section has a second movable wall operated by a force given from the outside of the liquid storage section which is generated by the atmospheric pressure, the driving force of a motor, the magnetic force or the force generated by a spring, and a volume of the liquid storage section is changed by the second movable wall so that the inner pressure of the liquid storage section can be maintained constant.

Due to the foregoing, when the reacting solution is moved from the liquid storage section to the reacting section, the second movable wall is moved in a direction so that the volume of the liquid storage section can be reduced. Accordingly, the inner pressure in the liquid storage section can be made constant without exchanging a substance with the outside of the fuel cell. Therefore, the aged deterioration of the reacting solution in the liquid storage section can be suppressed.

In the method of driving the second movable wall, a motor, magnet or spring is used. In the case of using a magnetic force, a magnet is arranged on the second movable wall and the stationary portion in the periphery of the movable wall, so that the second wall can be pushed by a repulsion of the magnet. In the case of using a spring, in the same manner as that described above, the spring is arranged, while connecting the second movable wall with the stationary portion in the periphery of the movable wall, so that the second movable wall can be pushed. Due to the foregoing, the pressure in the liquid storage section can be increased without using electric power.

In the case of conducting drive control with a motor, a method is provided in which the pressure in the liquid storage section is detected and a difference between the pressure in the liquid storage section and the initial pressure is detected and the motor is operated until the difference in pressure is eliminated. In the case of using a magnetic force, when an electromagnet is used, it is possible to change a magnetic force by adjusting an electric current flowing in the electromagnet. Therefore, while the electric current is being adjusted, the second movable wall can be moved by generating the magnetic force until the difference in pressure is eliminated in the same manner as that described above. Due to the foregoing, the pressure in the liquid storage section can be increased, and an output of the fuel cell can be enhanced.

The fuel cell system is characterized in that a face of the second movable wall opposing to the inner face of the liquid storage section is communicated with the atmosphere.

Due to the foregoing, a drive force given on the movable wall face becomes a difference in pressure between the inner pressure in the liquid storage section and the atmospheric pressure. Accordingly, even when the reacting solution flows out from the liquid storage section and the inner pressure in the liquid storage section is lowered, the inner pressure in the liquid storage section can be returned to a predetermined value without using electric power.

The fuel cell system is characterized in that the second movable wall is composed of a rubber-like elastic body. Therefore, when the reacting solution is moved, the second movable wall is deflected, so that the inner pressure in the liquid storage section can be maintained constant.

Due to the foregoing, the inner pressure in the liquid storage section can be maintained constant without using movable parts. Therefore, it becomes possible to eliminate a leakage of the reacting solution from a sliding portion between the liquid storage section and the movable parts. Accordingly, a volume of the use of the reacting solution can be increased.

The fuel cell system is characterized in that the pressure adjusting device is a gas passage, in which the reacting gas flows, provided between the liquid storage section and the reacting section.

Due to the foregoing, when the reacting gas flows into the liquid storage section, the inner pressure in the liquid storage section can be made to be the same as the pressure of the reacting gas which has flowed into the liquid storage section. As a result, in the case where the reacting gas supplied to the gas storage section is consumed and the inner pressure in the gas storage section and the reacting section is lowered, a difference in pressure is generated between the liquid storage section and the reacting section by the pressure of the reacting gas which has flowed into the liquid storage section, and the reacting solution can be supplied to the reacting section.

The fuel cell system is characterized in that the gas passage has a pressure reducing device, and the pressure reducing device reduces the pressure of the reacting gas, which flows from the reacting section to the liquid storage section, to a predetermined pressure.

Due to the foregoing, the inner pressure in the liquid storage section becomes a setting inner pressure of the pressure reducing device, and the inner pressure in the reacting section can be made higher than the setting pressure. When a regulator is used for the pressure reducing device, the inner pressure in the liquid storage section can be made to be a predetermined pressure without consuming electric power. Since no substance flows into the fuel cell system and no load is given to the fuel cell system from the outside, it is possible to tightly close the fuel cell system. Therefore, it is possible to build a stable device.

The fuel cell system is characterized in that the pipe diameter of the liquid supply passage is larger than the pipe diameter of the gas passage.

Due to the foregoing, the resistance at the time when the reacting gas passes in the gas passage is higher than the resistance at the time when the reacting solution passes in the passage. Accordingly, a flow of the reacting solution from the liquid storage section into the reacting section is much easier than a flow of the reacting gas. Accordingly, when the pressure in the liquid storage section becomes higher than the pressure in the reacting section, the reacting solution can be moved.

The fuel cell system is characterized in that the liquid supply passage is hydrophilic. In order to give the hydrophilicity, for example, $TiO_2$ is dispersed and coated.

Due to the foregoing, the passage gets wet with the reacting solution. Therefore, it is possible to reduce a friction loss caused in the flow of the reacting solution in the passage. Accordingly, concerning the substance flow conducted between the reacting section and the liquid storage section, the reacting solution can flow more easily than the reacting gas. Accordingly, it can be said that the reacting solution can easily flow from the liquid storage section to the reacting section when the inner pressure in the reacting section is reduced.

When the passage gets wet with the reacting solution, it becomes difficult for the gas to enter the passage. Accordingly, when the reacting solution is moved from the liquid storage section to the reacting section, no gas enters the passage. Accordingly, a movement of the reacting solution can not be obstructed.

The fuel cell system is characterized in that the gas passage is hydrophobic. In order to give hydrophobicity, for example, a water repellent agent such as PTFE may be coated.

Due to the foregoing, it become difficult for the reacting solution to enter the gas passage. Accordingly, in the case where the reacting gas is generated and the pressure in the reacting section becomes higher than the pressure in the liquid storage section, the reacting gas is not obstructed from flowing into the liquid storage section. Accordingly, it can be said that even when the inner pressure in the liquid storage section is lowered in the case where the reacting solution is moved from the liquid storage section to the reacting section, the inner pressure in the liquid storage section can be quickly raised.

Further, the fuel cell system is characterized in that the liquid supply passage and gas supply passage are respectively a film or a porous member through which liquid is transmitted.

Due to the foregoing, the passage and the gas passage can be easily made.

The present invention provides a fuel cell system comprising: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being used as fuel; and a liquid feeding device for feeding the reacting solution from the liquid storage section to the reacting section, wherein the liquid feeding device prevents the reacting solution from flowing backward from the reacting section to the liquid storage section, and when the inner pressure in the gas storage section is lowered according to the consumption of the reacting gas, the liquid feeding device moves the reacting solution from the liquid storage section to the reacting section.

Due to the foregoing, the reacting solution is moved by the inner pressure in the gas storage section. That is, irrespective of the inner pressure in the reacting section, when a volume of the reacting gas in the periphery of the fuel cell is lowered, the reacting solution is sent to the reacting section, so that the reacting gas can be generated. Especially, in the case where a subsidiary product is generated in the reacting section, in order to prevent the movement of the subsidiary product to the gas storage section, it is preferable that a reacting gas transmitting film is arranged between the reacting section and the gas storage section. However, in this case, it is impossible for the inner pressure in the gas storage section to instantaneously cope with the inner pressure in the reacting section. However, in the present structure, even when a volume of the reacting gas in the gas storage section is decreased, since the reacting gas can be generated by supplying the reacting solution from the liquid storage section to the reacting section, the reacting gas can be quickly supplied to the gas storage section.

The fuel cell system is characterized in that the liquid feeding section includes: an accommodating section for accommodating the reacting solution which moves from the liquid storage section to the reacting section; and an accommodating section moving mechanism for moving the accommodating section, and the accommodating section is a container having an opening section and a shut-off section, when the opening section moves to the reacting section and the shut-off section moves to the liquid storage section according to a decrease in the inner pressure in the gas storage section, the communication between the accommodating section and the liquid storage section is shut off and the accommodating section and the reacting section are communicated with each other, and when the opening section moves to the liquid storage section and the shut-off section moves to the reacting section according to an increase in the inner pressure in the gas storage section, the accommodating section and the liquid storage section are communicated with each other and the communication between the accommodating section and the reacting section is shut off.

Due to the foregoing, when the inner pressure in the gas storage section is decreased to be lower than the inner pressure in the liquid storage section, the reacting solution accommodated in the accommodating section is supplied from the liquid storage section to the reacting section. The reacting solution accommodated in the accommodating section does not flow backward to the liquid storage section at this time.

At this time, to be in more detail, the accommodating section moving mechanism includes a third movable wall and a pressurizing means, the third movable wall is arranged facing the gas storage section, the pressurizing means is arranged on a face opposing to the gas storage section of the third movable wall, and when the inner pressure in the gas storage section is lower than the pressure of the pressurizing means, the third movable wall is moved to the gas storage section side and the accommodating section is moved in the direction coming into contact with the reacting section, and when the inner pressure in the gas storage section is higher than the pressure of the pressurizing means, the third movable wall is moved to the pressurizing means side and the accommodating section is moved in the direction coming into contact with the liquid storage section.

The action of the present structure will be explained below. In the case where the inner pressure in the gas storage section is higher than the pressure generated by the pressurizing means, the third movable wall is moved to the pressurizing means side. Being linked with this movement of the third movable wall, the opening portion of the accommodating section is moved to the liquid storage section, and the accommodating section and the liquid storage section are connected with each other. Accordingly, the reacting solution can be accommodated in the accommodating section. On the other hand, in the case where the inner pressure in the gas storage section is lower than the pressure generated by the pressurizing means, the third movable wall is moved to the gas storage section side. Being linked with this movement of the third movable wall, the opening portion of the accommodating section is moved to the reacting section, and the reacting section and the accommodating section are connected with each other. Accordingly, the reacting solution can be moved to the reacting section.

In this case, it is preferable to arrange a capillary tube, film, porous member or cloth at the circulation port between the accommodating section and the reacting section. Due to the foregoing, it becomes possible to facilitate a movement of the reacting solution from the accommodating section to the reacting section by the surface tension.

Due to the foregoing, the reacting solution can be moved by a decrease in the pressure in the gas storage section without consuming electric power.

The fuel cell system is characterized in that the pressurizing means includes a motor, a magnet, a spring or an elastic body.

In this case, it is possible to consider that the pressurizing means is formed into a cylindrical shape and a plunger provided in the cylinder is made to be the third movable wall. When a face opposing to the gas storage section of the third movable wall is pushed by the above parts, the third movable wall can be moved being balanced with the inner pressure in the gas storage section.

The fuel cell system is characterized in that the pressure of the pressurizing means is the atmospheric pressure.

In this case, it is possible to consider that the pressurizing means is formed into a cylindrical shape and a plunger provided in the cylinder is made to be the third movable wall and one end portion of the cylinder is connected to the inside of the gas storage section and the other end portion of the cylinder is connected to the inside of the liquid storage section. When a face opposing to the gas storage section of the third movable wall is communicated with the atmosphere, it is possible to build a pressurizing means capable of raising the pressure in the gas storage section higher than the atmospheric pressure.

The fuel cell system is characterized in that the pressure of the pressurizing means is the pressure in the liquid storage section.

In this case, it is possible to consider that the pressurizing means is formed into a cylindrical shape and a plunger provided in the cylinder is made to be the third movable wall and one end portion of the cylinder is connected to the inside of the gas storage section and the other end portion of the cylinder is connected to the inside of the liquid storage section. When the pressure given to the face opposing to the gas storage section of the third movable wall is made to be the inner pressure in the liquid storage section, it is possible to build a pressurizing means capable of raising the inner pressure in the gas storage section higher than the inner pressure in the liquid storage section.

A fuel cell system comprises: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being electrochemically reacted and used as fuel; and a bulkhead for partitioning the reacting section and the reacting solution, wherein at least one of the bulkhead and the reacting section is movable and capable of being moved in a direction so that a contact area of the reacting section with the reacting solution can be changed.

Due to the foregoing, the generation and stoppage of the reacting gas can be conducted. According to the output of the fuel cell, a decreasing rate of the inner pressure of the gas storage section is changed. According to this change, a movement conducted by the moving means is changed. As a result, a contact area of the reacting solution with the reacting member can be made variable. Accordingly, a volume of the generated reacting gas can be controlled according to the output of the fuel cell. That is, in the case where a large volume of the reacting gas is required by the electrode, a contact area of the reacting solution with the reacting section is increased, so that the volume of the generated reacting gas can be increased.

In this case, a substance, which is capable of generating the reacting gas when it is contacted with the reacting solution, is arranged so that it can be used as the reacting member. That is, when the reacting solution is an aqueous solution of the metal hydride complex compound, its catalyst is arranged in the reacting section. On the contrary, when the reacting section is the metal hydride complex compound or its aqueous solution, the reacting solution is made to be an aqueous solution of the catalyst. In the case where hydrogen is generated by using the reacting solution of alcohol represented by methanol, ether or organic chemical hydride represented by cyclohexane, it is necessary to heat. Therefore, when a heater is arranged in the reacting member and the catalyst is provided, hydrogen can be generated.

Further, the fuel cell system is characterized as follows. The bulkhead is arranged on a face on the reacting solution side of the reacting section, the bulkhead moving means has a pressurizing device for pressurizing the bulkhead in a direction so that the reacting section and the reacting solution can be contacted with each other, the bulkhead is moved by a difference in pressure between the pressurizing means and the reacting gas, and a moving direction of the bulkhead is changed by a change in the pressure caused by the generation and consumption of the reacting gas.

Furthermore, the fuel cell system is characterized as follows. The bulkhead is arranged on a face on the reacting solution side of the reacting section, the reacting section moving means has a pressurizing device for pressurizing the reacting section in a direction so that the reacting section and the reacting solution can be contacted with each other, the reacting section is moved by a difference in pressure between the pressure in the pressurizing means and the pressure in the reacting gas, and a moving direction of the reacting section is changed by a change in the pressure caused by the generation and consumption of the reacting gas.

Due to the above structure, when the pressure of the reacting gas is raised, the reacting section is shut off by the bulkhead. Therefore, the reacting section is not contacted with the reacting solution and the gas generation is stopped.

The pressurizing device may be composed of an elastic body made of rubber or spring. Alternatively, the pressurizing device may be composed of a magnet, a motor or a device in which an electrostatic phenomenon or a piezoelectric phenomenon is used. Alternatively, it is possible to adopt such a structure that a portion of a wall face of a closed container, in which gas or liquid is accommodated, is made to be movable and the container is attached to the bulkhead or the reacting member. It is preferable that a member not consuming electric power is used. However, the frequency of operating the movable portion is not so high. Therefore, even when electric power is consumed, the power consumption is small.

The fuel cell system is characterized in that a through-hole, through which the reacting section is contacted with the reacting solution, is formed in a portion of the bulkhead.

Due to the above structure, the reacting solution can be supplied to the reacting section through the through-hole.

A fuel cell system having an electrode, which is arranged being joined to a solid high molecular electrolyte film, generating electricity while the reacting gas is being electrochemically reacted, comprises: a storage tank for storing the reacting gas; a gas section into which the reacting gas flows and from which the reacting gas is sent out to the electrode; a gas tube for supplying the reacting gas from the storage tank to the gas section; and a pressure reducing section, which is arranged in the gas tube and used for adjusting the pressure of the reacting gas sent out to the gas section, wherein a reduction of the inner pressure in the gas section at the time of generating electricity by the fuel cell is caused only by the reaction conducted in the fuel cell.

Due to the foregoing, the reacting gas flows into the gas section according to the balance between the inner pressure of the gas section and the output pressure of the pressure reducing means. Accordingly, in the fuel cell, when the reacting gas is consumed and the inner pressure in the gas section is decreased, the reacting gas can be supplied to the gas section.

As explained above, in order to solve the above problems, the present invention provides a fuel cell system comprising: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being used as fuel; and a reacting solution supply volume adjusting means for supplying the reacting solution from the liquid storage section to the reacting section in the case where the pressure in the liquid storage section is higher than the pressure in the reacting section and for stopping the supply of the reacting solution in the case where the pressure in the liquid storage section is lower than the pressure in the reacting section.

As described above, a volume of supplying the reacting solution can be controlled in accordance with the state of driving the fuel cell without directly detecting an output electric power of the fuel cell. That is, since no electrical control signals are used for controlling a volume of the reacting solution, it is unnecessary to conduct electrical processing relating to the control. Therefore, it is unnecessary to provide electronic parts. Accordingly, the energy consumption can be reduced, and the number of part scan be decreased. Further, since the reacting solution can be supplied in accordance with the state of driving the fuel cell, the fuel utilizing efficiency, which is a ratio of the volume of the supplied reacting gas to the volume of the consumed gas, can be enhanced.

A fuel cell system comprises: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being used as fuel; and a liquid feeding device for feeding the reacting solution from the liquid storage section to the reacting section, wherein the liquid feeding device prevents the reacting solution from flowing backward from the reacting section to the liquid storage section, and when the inner pressure in the gas storage section is lowered according to the consumption of the reacting gas, the liquid feeding device moves the reacting solution from the liquid storage section to the reacting section.

Due to the foregoing, the reacting solution is moved by the inner pressure in the gas storage section. That is, when a volume of the reacting gas in the periphery of the fuel cell is reduced, the reacting solution can be sent to the reacting section and the reacting gas can be generated irrespective of the inner pressure in the reacting section. Especially, in the case of generating a subsidiary product in the reacting section, in order to prevent the subsidiary product from moving into the gas storage section, it is preferable to arrange a reacting gas transmitting film between the reacting section and the gas storage section. However, in this case, it is impossible for the inner pressure in the gas storage section to instantaneously cope with a change in the inner pressure in the reacting section. However, according to the present structure, even when a volume of the reacting gas in the gas storage section is decreased, the reacting solution can be supplied from the liquid storage section to the reacting section and the reacting gas can be generated. Therefore, the reacting gas can be quickly supplied to the gas storage section.

A fuel cell system comprises: a liquid storage section for storing a reacting solution; a reacting section for generating reacting gas from the reacting solution supplied from the liquid storage section; a gas storage section for storing the reacting gas supplied from the reacting section; a fuel cell having an electrode which is arranged being joined to a solid high molecular electrolyte film, generating electricity while the reacting gas supplied from the gas storage section is being electrochemically reacted and used as fuel; and a bulkhead for partitioning the reacting section and the reacting solution, wherein at least one of the bulkhead and the reacting section is movable and capable of being moved in a direction so that a contact area of the reacting section with the reacting solution can be changed.

Due to the foregoing, the generation and stoppage of the reacting gas can be conducted. According to the output of the fuel cell, the decreasing ratio of the inner pressure in the gas storage section is changed. According to this change in the decreasing ratio, a movement conducted by the moving means is changed. As a result, a contact area of the reacting solution with the reacting member can be made variable. Accordingly, a volume of the generated gas corresponding to the output of the fuel cell can be controlled.

A fuel cell system having an electrode, which is arranged being joined to a solid high molecular electrolyte film, generating electricity while the reacting gas is being electrochemically reacted, comprises: a storage tank for storing the reacting gas; a gas section into which the reacting gas flows and from which the reacting gas is sent out to the electrode; a gas tube for supplying the reacting gas from the storage tank to the gas section; and a pressure reducing section, which is arranged in the gas tube and used for adjusting the pressure of the reacting gas sent out to the gas section, wherein a reduction of the inner pressure in the gas section at the time of generating electricity by the fuel cell is caused only by the reaction conducted in the fuel cell.

Due to the foregoing, the reacting gas flows into the gas section according to the balance between the inner pressure in the gas section and the output pressure of the pressure reducing means. Accordingly, in the fuel cell, when the reacting gas is consumed and the inner pressure in the gas section is decreased, the reacting gas can be supplied to the gas section.

Due to the above structure, energy, which is necessary for supplying appropriate volumes of fuel and oxidant to the electrode of the fuel cell, can be reduced, and the control mechanism for controlling a volume of supply and the control mechanism for controlling an reaction can be made small in volume. Accordingly, it becomes possible to provide a small and safe fuel cell, the fuel utilizing efficiency of which is high, which is advantageous from the viewpoint of energy density.

DETAILED DESCRIPTION OF THE PREFERRED EMBODIMENTS

The present invention will be explained in detail on the basis of embodiments.

Embodiment 1

Figure 1:
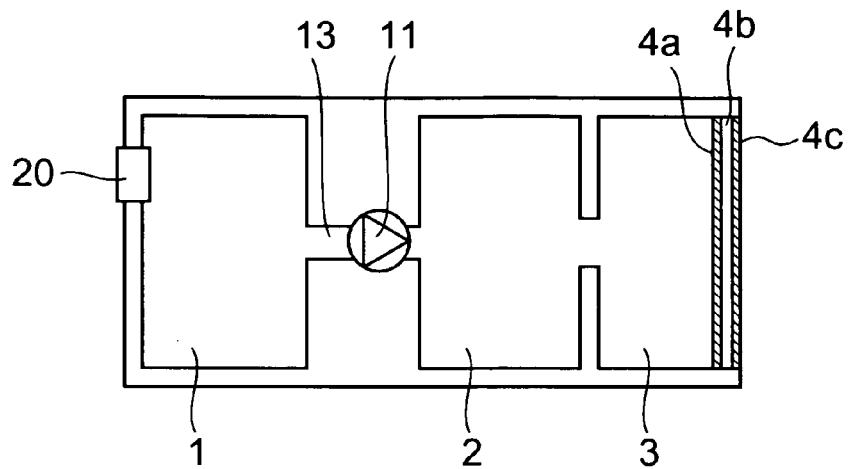
FIG. 1 is an arrangement view showing a fuel cell system of the present invention.

FIG. 1 is an arrangement view showing a fuel cell system of the present invention. The fuel cell system mainly includes a liquid storage section 1, a reacting section (reaction section) 2, a gas storage section 3 and a fuel cell. The liquid storage section 1 is a portion for storing a reacting solution to generate hydrogen. The reacting solution is supplied to the reacting section 2 through the liquid supply passage 13. The reacting section 2 is provided with a reactant capable of generating hydrogen when it comes into contact with the reacting solution. When the reacting solution is supplied to the reacting section 2, hydrogen is generated in the reacting section 2. The thus generated hydrogen is supplied to the gas storage section 3. In the gas storage section 3, the hydrogen supplied from the reacting section 2 is temporarily stored. The fuel cell includes an anode 4a, a solid high molecular electrolyte film 4b and a cathode 4c. Hydrogen in the gas storage section 3 is electrochemically oxidized by the anode 4a and electricity is generated.

The fuel cell is a so-called solid polymer type fuel cell. To be in more detail, the fuel cell includes: an anode 4a for electrochemically oxidizing hydrogen; a cathode 4c for electrochemically reducing oxygen; and a solid high molecular electrolyte film 4b interposed between the anode 4a and the cathode 4c. In this case, since the gas storage section 3 is tightly closed by the solid high molecular electrolyte film 4b, the hydrogen stored in the gas storage section 3 does not leak outside but is consumed by the anode 4a.

The liquid storage section 1 includes: a pressure adjusting device 20; and a liquid supply passage 13 for supplying a reacting solution to the reacting section 2. The first check valve 11 is arranged in the liquid supply passage 13. The pressure adjusting device 20 is a device for maintaining the pressure in the liquid storage section 1 constant. By the action of the pressure adjusting device 20, even when the inner pressure in the liquid storage section 1 is temporarily decreased, it can be returned to the initial pressure. A factor of decreasing the inner pressure in the liquid storage section 1 is the supply of the reacting solution to the reacting section 2 through the liquid supply passage 13. In this connection, by the action of the first check valve 11, there is no possibility that the hydrogen generated in the reacting section 2 flows into the liquid storage section 1.

Figure 2:
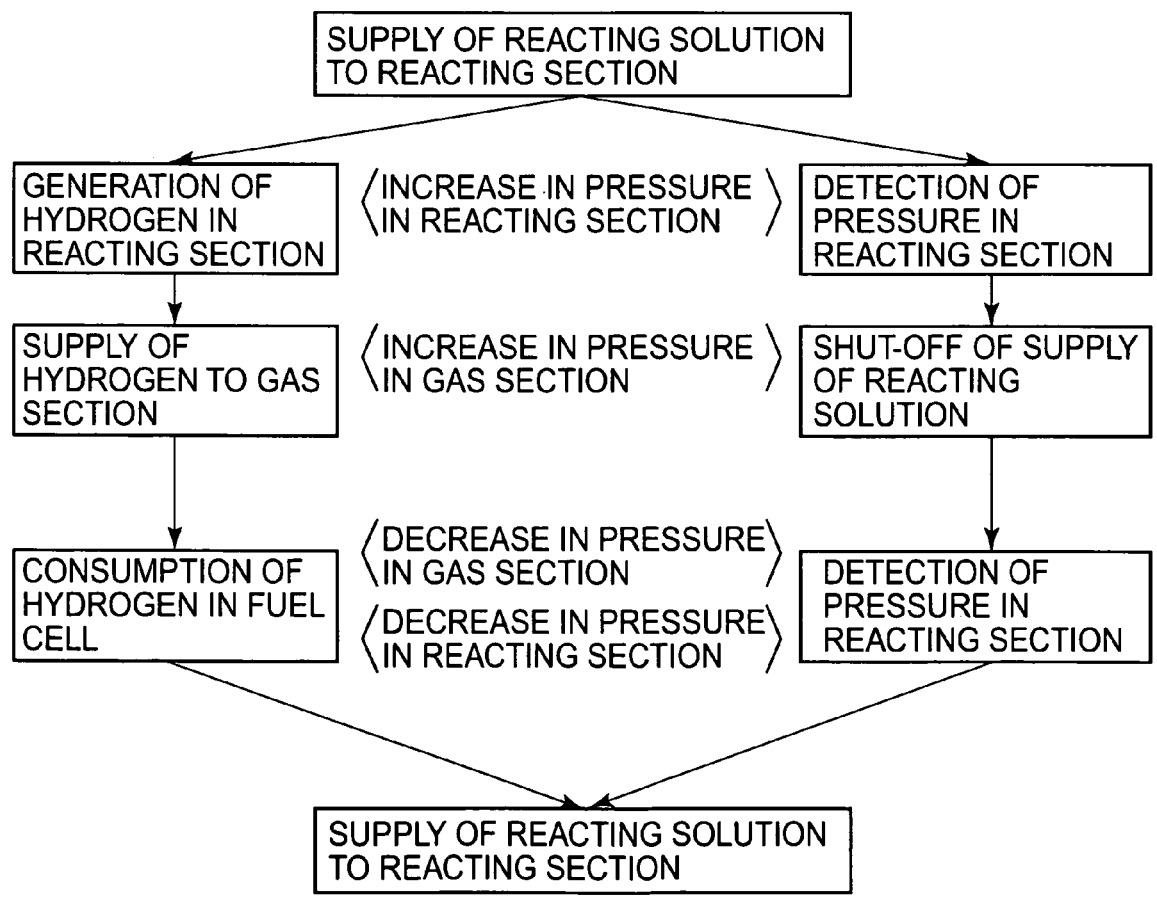
FIG. 2 is a flow chart showing a control method of controlling a volume of hydrogen to be supplied of the present invention.

The control method of controlling a volume of hydrogen to be supplied of the present invention is shown in the flow chart in FIG. 2.

According to the flow chart in FIG. 2, first of all, when the reacting solution is supplied to the reacting section 2, hydrogen is generated in the reacting section 2. Therefore, the pressure in the reacting section 2 is raised, and the hydrogen is supplied to the gas storage section 3. Further, the hydrogen is supplied from the gas storage section 3 to the anode 4a. At this time, the hydrogen can be prevented from flowing into the liquid storage section 1 by the action of the first check valve 13. Accordingly, the pressure in the liquid storage section 1 is maintained constant by the pressure adjusting device 20. Due to the foregoing, the pressure in the reacting section 2 is raised. However, since the pressure in the liquid storage section 1 is not changed, the pressure in the liquid storage section 1 is lower than the pressure in the reacting section 2, and the supply of the reacting solution from the liquid storage section 1 to the reacting section 2 is stopped.

Next, when the hydrogen is consumed by the generation of electricity, the inner pressure in the gas storage section 3 and the reacting section 2 is lowered. When the inner pressure in the reacting section 2 is decreased to be lower than the inner pressure in the liquid storage section 1, in order to correct the differential pressure, the reacting solution is supplied from the liquid storage section 1 to the reacting section 2. The same operation is repeatedly conducted hereinafter.

In this embodiment, a fuel cell, the specific structure of which is described below, was used. A film electrode joining body was made in which a catalyst layer composed of a carbon layer born by platinum was coated on both sides of the solid high molecular electrolyte film 4c. This film electrode joining body was interposed between pieces of carbon cloth. A member having cavities for storing hydrogen inside was attached at a position, which covered the anode 4a, so that the inside hydrogen could not leak outside. In this way, the gas storage section 3 was formed. Acrylic containers were used for the liquid storage section 1 and there acting section 2. The liquid storage section 1 accommodated a reacting solution of a 4 cc aqueous solution of 25 wt % sodium boron hydride, and the reacting section 2 accommodated an acid aqueous solution of pH3 for generating hydrogen from sodium boron hydride. The liquid supply passage 13 was provided between the liquid storage section 1 and the reacting section 2. A check valve was attached to the liquid supply passage 13. The reacting section 2 and the gas storage section 3 were connected to each other so that gas could be communicated between them.

A volume of the accumulation of generated hydrogen was 2.4 L under the above condition. Electric power 5.7 Ahr can be theoretically taken out in the above circumstances.

In the above fuel cell system, it was possible to continue generating electricity for 10.9 hours at the constant current 0.5 A. The efficiency of electric current generation with respect to the theoretical value was 96%. As a result of the experiment in which the electric current was variously changed, the electric current generation efficiency was 96%. This is the result obtained when the present fuel cell system automatically changed a volume of hydrogen generation without consuming electric power. Therefore, it was made clear that the fuel cell system of the present invention can automatically cope with various cases of the electric power output.

The first comparative example was executed as follows. The aforementioned aqueous solution was mixed so as to generate hydrogen. When the thus generated hydrogen was sent to the fuel cell, electric power was generated at the constant current 0.5 A for 50 minutes. However, substantially simultaneously when the hydrogen generating reaction was finished, the generation of electric power was stopped. In this case, the electric current generating efficiency was 7%. The reason why the electric current generating efficiency was low was that the generated hydrogen leaked outside the fuel cell and the volume of hydrogen to generate electricity was insufficient.

The second comparative example was executed as follows. An ultra low volume of an aqueous solution of sodium boron hydride was continuously sent to the reacting section 2 by a pump. Electric power consumption of the pump was 100 mW. The generation of electric power by the fuel cell continued for 9.5 hours, and the electric current generating efficiency was 84%. However, since electric power was consumed by the pump, only 50% of the theoretical electric power was practically used. As a result of the experiment of generating electricity by the fuel cell in which the electric current was variously changed, the electric current generating efficiency was 74%. The net electric power, in which the electric power consumption of the pump was considered, was 40% of the theoretical value. The cause of the decrease in the electric current generating efficiency is described as follows. Since a volume of the discharged reacting solution was very small, it was difficult to stabilize the volume of the discharged reacting solution. Further, it was difficult to operate the pump in accordance with the output of the fuel cell. It was confirmed again that the effective output of the fuel cell was lowered because the pump consumed electric power.

In this connection, in this embodiment, the generation of hydrogen was described. However, this description can be also applied to the generation of oxygen. That is, when manganese dioxide is arranged in the reacting section 2 and hydrogen peroxide is used for the reacting solution, it is possible to control the generation of oxygen. In this case, the gas storage section 3 becomes a temporary storage portion for storing oxygen so that oxygen can be sent to the cathode 4c in the power generating section 4.

Embodiment 2

Figure 3:
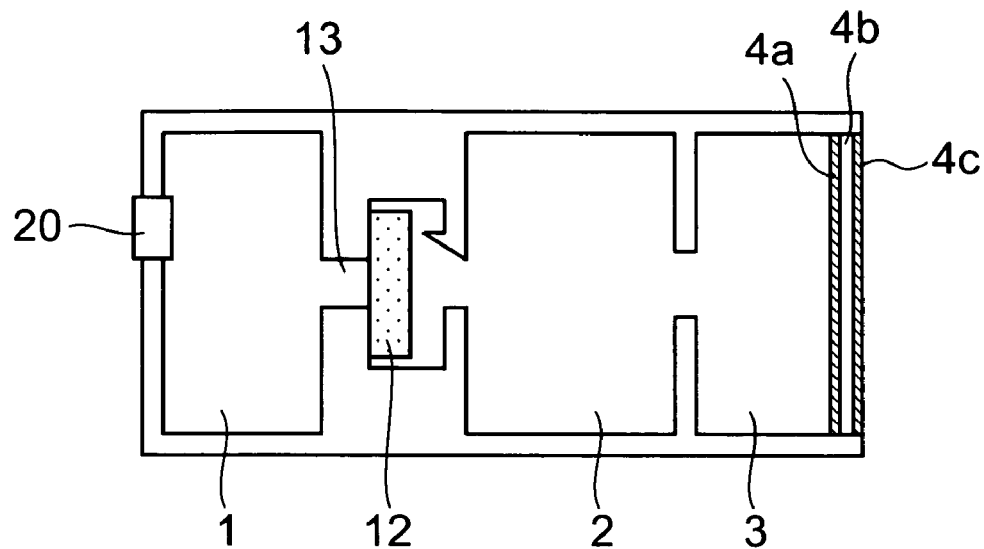
FIG. 3 is an arrangement view showing a case in which a movable wall is used for a check device of a fuel cell system of the present invention.
Figure 3:
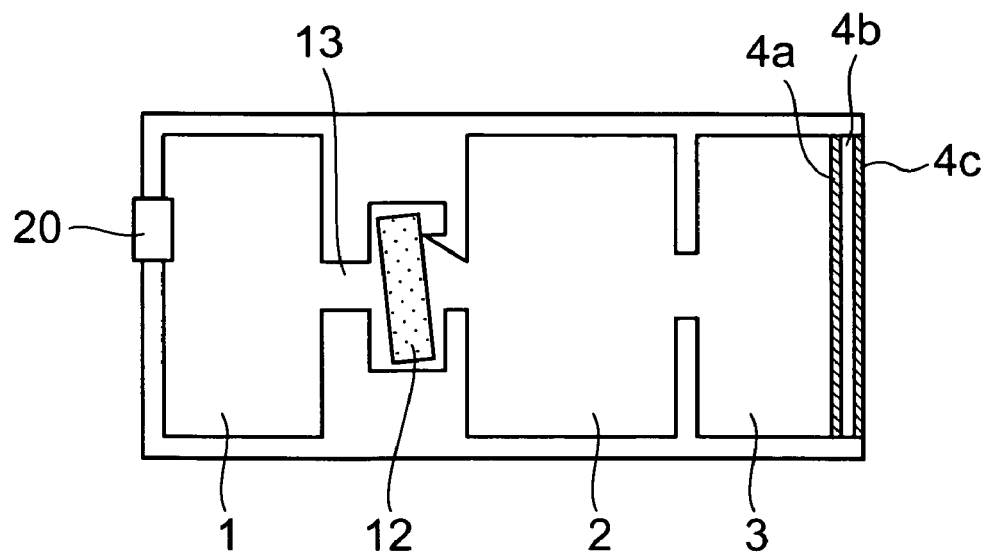

FIG. 3 is a view showing a structure in which a movable wall is used for the check device of the fuel cell system of the present invention. FIG. 3(a) shows a state in which the reacting solution is stopped in its movement, and FIG. 3(b) shows a state in which reacting, solution is moved. The constitution and function of the liquid storage section 1, the reacting section 2, the gas storage section 3 and the electric power generating section are the same as those of Embodiment 1.

The structure of the present embodiment is different from that of the embodiment described above as follows. The first movable wall 12 was used for the check structure arranged in the liquid supply passage 13. The first movable wall 12 is arranged in a space connected to the liquid supply passage 13, and the cross-section of the first movable wall 12 is larger than that of the liquid supply passage 13. When the first movable wall 12 is moved to the liquid storage section 1 side, the liquid supply passage 13 is closed. When the first movable wall 12 is moved to the reacting section 2 side, the liquid supply passage 13 is opened. According to the change in the pressure in the liquid storage section 1 and the reacting section 2, this structure is operated as follows.

First, in the case shown in FIG. 3(a) in which the reacting solution is stopped in its movement, the pressure in the reacting section 2 is higher than the pressure in the liquid storage section 1. Accordingly, the first movable wall 12 is moved to the liquid storage section 1 side in response to this pressure differential, and the liquid supply passage 13 is closed and the movement of the reacting solution is stopped.

Next, in the case shown in FIG. 3(b) in which the reacting solution is moved, the pressure in the liquid storage section 1 is higher than the pressure in the reacting section 2. Accordingly, the first movable wall 12 is moved to the reacting section 2 side, and the liquid supply passage 13 is opened. At the same time, since the pressure in the liquid storage section 1 is higher than the pressure in the reacting section 2, the reacting solution is supplied to the reacting section 2.

Further, when hydrogen is generated from the reacting solution in the reacting section 2, the above phenomenon is repeatedly conducted.

In this embodiment, an aqueous solution of cobalt chloride was used for the reacting solution, and while hydrogen was being generated by putting sodium boron hydride into the reacting section 2, the fuel cell was operated. It was confirmed that the aqueous solution of cobalt chloride was moved to the reacting section 2 according to the operation of the fuel cell, and the fuel cell was continuously operated.

Embodiment 3

Figure 4:
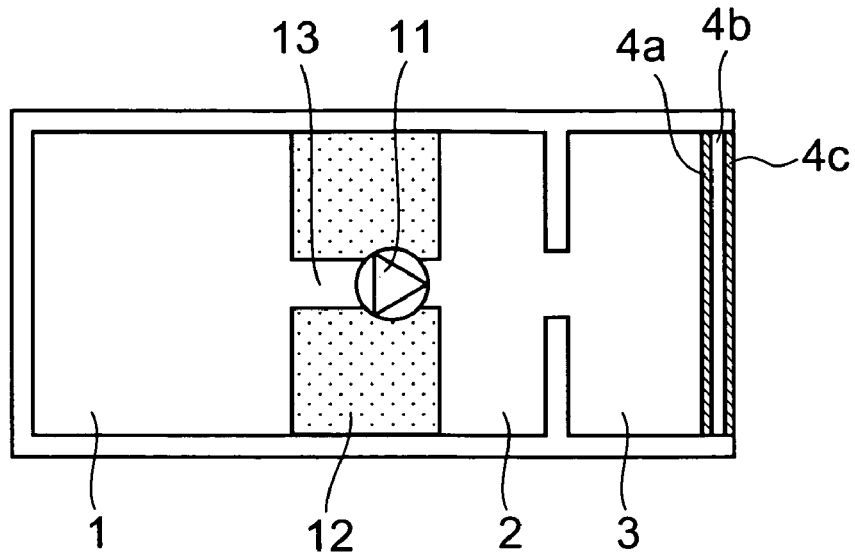
FIG. 4 is an arrangement view showing a case in which a movable wall is used for a check device of a fuel cell system of the present invention.
Figure 4:
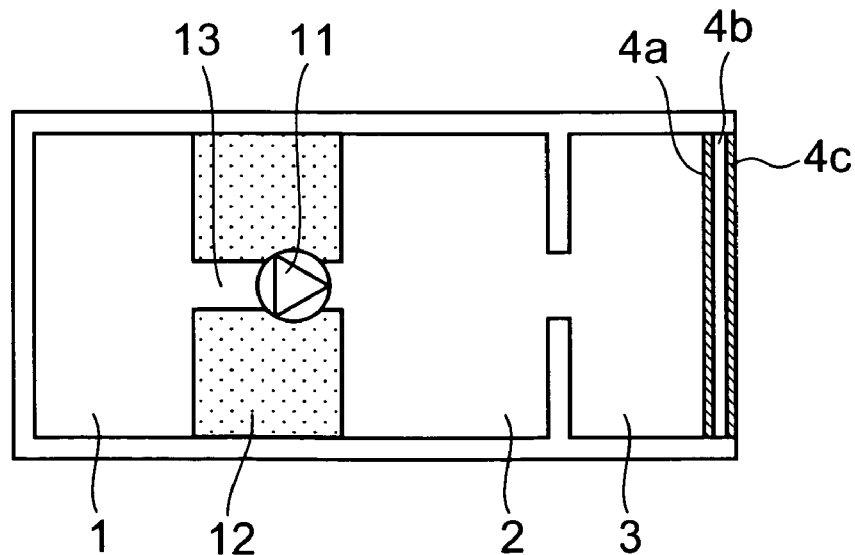

FIG. 4 is a view showing a structure in which a movable wall is used for the check device of the fuel cell system of the present invention. FIG. 4(a) shows a state in which the reacting solution is stopped in its movement, and FIG. 4(b) shows a state in which the reacting solution is moved. The constitution and function of the liquid storage section 1, the reacting section 2, the gas storage section 3 and the fuel cell are the same as those of Embodiment 1.

The structure of the present embodiment is different from that of the above embodiment as follows. The check valve 11 and the first movable wall 12 were used for the check structure arranged in the liquid supply passage 13. The check valve 11 is opened in the direction from the liquid storage section 1 to the reacting section 2 and closed in the opposite direction. This structure is operated as follows.

First, in the case shown in FIG. 4(a) in which the reacting solution is stopped in its movement, the pressure in the reacting section 2 is higher than the pressure in the liquid storage section 1. Accordingly, the check valve 11 and the first movable wall 12 are given a force, however, since the liquid storage section 1 is filled with liquid, the movable wall 12 is not moved.

Next, in the case shown in FIG. 4(b) in which the reacting solution is moved, since the pressure in the reacting section 2 is lower than the pressure in the liquid storage section 1, a force is given so that the first movable wall 12 and the reacting solution in the liquid supply passage 13 can be moved to the reacting section 2 side. However, since the reacting solution can be more easily moved than the first movable wall 12 because of its low friction, the reacting solution is supplied from the liquid storage section 1 through the check valve 11 to the reacting section 2. Accordingly, the first movable wall 12 is moved in the direction so that a volume of the liquid storage section 1 can be reduced corresponding to the volume of the reacting solution supplied from the liquid storage section 1 to the reacting section 2.

In the same manner as that of Embodiment 2, it was confirmed that an aqueous solution of cobalt chloride was moved to the reacting section 2, and the fuel cell was continuously operated.

Embodiment 4

Figure 5:
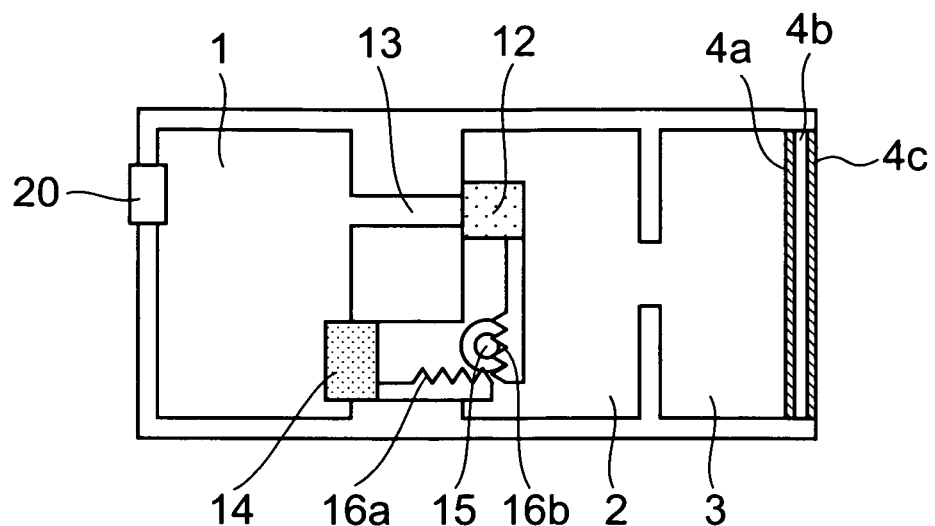
FIG. 5 is an arrangement view showing a case in which a movable wall is used for a check device of a fuel cell system of the present invention.
Figure 5:
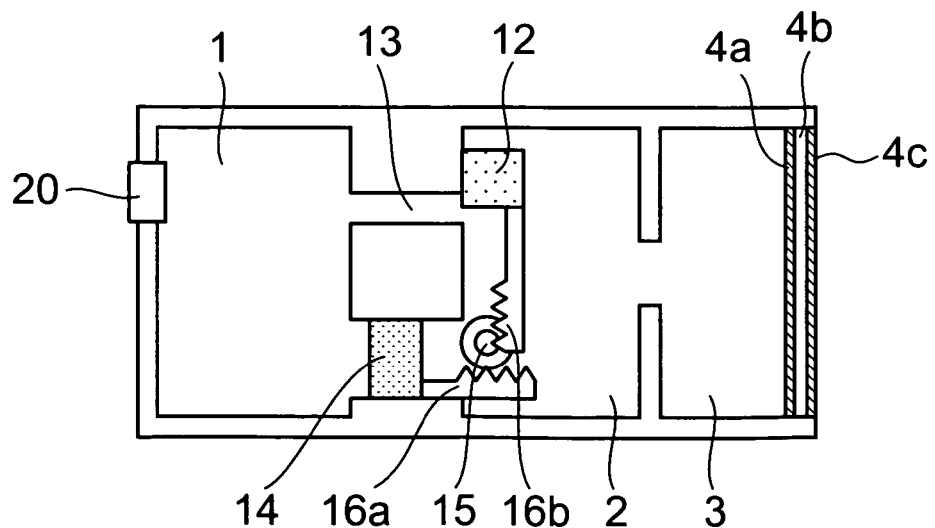

FIG. 5 is a view showing a structure in which a movable wall is used for the check device of the fuel cell system of the present invention. FIG. 5(*a*) shows a state in which the reacting solution is stopped in its movement, and FIG. 5(*b*) shows a state in which reacting solution is moved. The constitution and function of the liquid storage section 1, the reacting section 2, the gas storage section 3 and the fuel cell are the same as those of Embodiment 1.

The structure of this embodiment is different from that of the embodiment described above as follows. When the first movable wall 12 slides in the direction perpendicular to the liquid supply passage 13, the liquid supply passage 13 is opened and closed. In order to move the first movable wall 12, the structure is composed as follows. There is provided a plunger 14, which moves when the plunger is given the inner pressure of the liquid storage section 1 and the reacting section 2, between the liquid storage section 1 and the reacting section 2. The plunger 14 is attached with a slider 16*a*, and the first movable wall 12 is attached with a slider 16*b*. The gear 15 is arranged so that the sliders 16*a* and 16*b* can be moved being linked with each other. When the plunger 14 is moved, the slider 16*a* rotates the gear 15 in accordance with the movement of the plunger 14. Accordingly, the slider 16*b* is slid. As a result, the first movable wall 12 can be moved.

When the pressure in the reacting section 2 is higher than the pressure in the liquid storage section 1, the plunger 14 is moved to the liquid storage section 1 side, and the first movable wall 12 closes the liquid supply passage 13 as shown in FIG. 5(*a*). Accordingly, no reacting solution is moved.

When the pressure in the reacting section 2 is lower than the pressure in the liquid storage section 1, the plunger 14 is moved to the reacting section 2 side, and the first movable wall 12 opens the liquid supply passage 13 as shown in FIG. 5(*b*). Therefore, the reacting solution passes through the liquid supply passage 13 and is supplied to the reacting section 2 by the differential pressure between the liquid storage section 1 and the reacting section 2.

Accordingly, it was possible to build a fuel cell system in which no electric power is consumed and a volume of the reacting solution is automatically adjusted.

Embodiment 5

Figure 6:
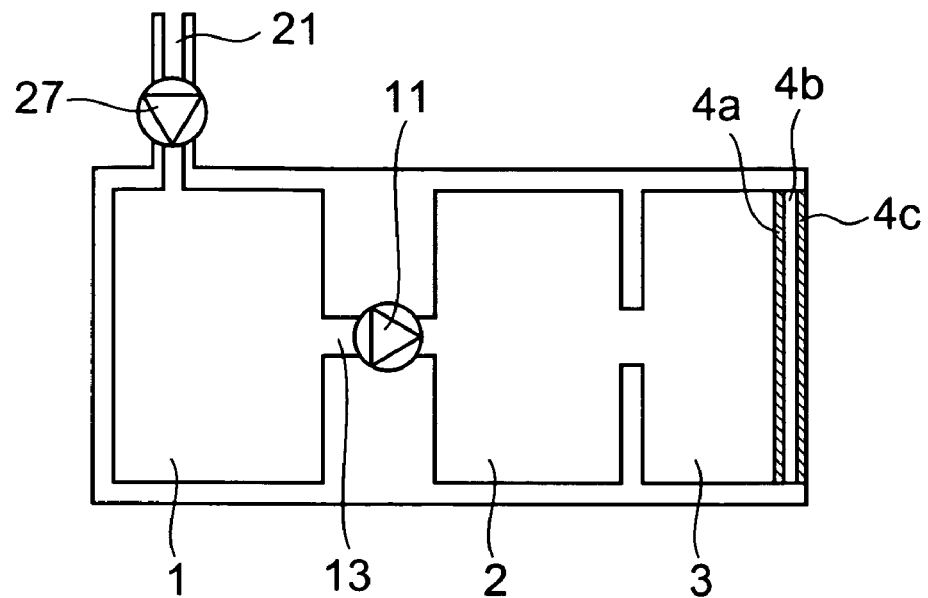
FIG. 6 is an arrangement view showing a case in which a check valve is attached to a pressure control device of a liquid storage section of a fuel cell system of the present invention.

FIG. 6 is an arrangement view showing a case in which a check valve is attached to the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device is composed of an external substance taking port 21 and a second check valve 27 arranged at the external substance taking port 21. A reduction in the pressure in the liquid storage section 1, which is caused when the reacting solution is supplied from the liquid storage section 1 to the reacting section 2, is suppressed when gas and liquid are taken into the liquid storage section 1 through the external substance taking port 21 from the outside of the fuel cell system. Therefore, the inner pressure in the liquid storage section 1 can be maintained constant.

Specifically, 50 mL of an aqueous solution of sodium hydroxide of 1 mol/L is accommodated in the liquid storage section 1, and 5 g of flakes of aluminum are accommodated in the reacting section 2. In this connection, when the substances are provided by the quantities described above, aluminum is left because all aluminum has not been reacted yet. Therefore, although not shown in the drawing, a container, into which sodium hydroxide of 1 mol/L is put, is attached to the external substance taking port 21, and when the pressure in the liquid storage section 1 is decreased, the aqueous solution of sodium hydroxide is moved to the liquid storage section 1. Due to the foregoing, since an aqueous solution of sodium hydroxide can be continuously replenished to the liquid storage section 1, all flakes of aluminum can be used for generating hydrogen, and the fuel cell continues to generate electricity until the hydrogen generating reaction is finished. As described above, according to this structure, it was possible to automatically adjust the pressure in the liquid storage section 1 without using a device consuming electric power. As a result, it was possible to continuously drive the fuel cell. Further, it was confirmed that the electric power generating time was able to be extended by using the reacting solution for the external substance.

Embodiment 6

Figure 7:
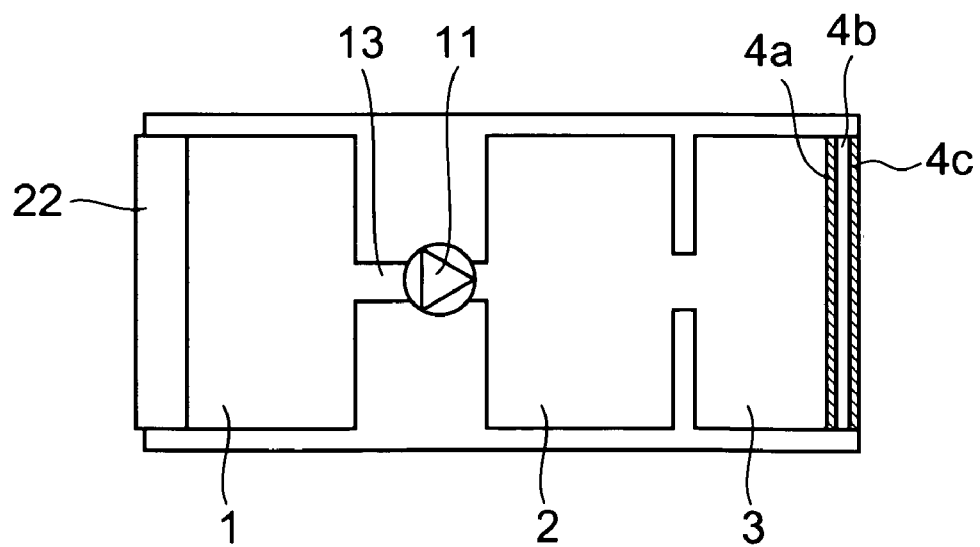
FIG. 7 is an arrangement view showing a case in which a movable wall is used for a pressure adjusting device of a liquid storage section of a fuel cell system of the present invention.

FIG. 7 is an arrangement view showing a case in which a movable wall is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device is the second movable wall 22 attached to the liquid storage section 1. The action will be described below. When the reacting solution is moved from the liquid storage section 1 to the reacting section 2, the inner pressure in the liquid storage section 1 is lowered. Therefore, a differential pressure is generated between the atmospheric pressure and the inner pressure in the liquid storage section 1. Accordingly, the second movable wall 22 is moved by the differential pressure to the side on which a volume of the liquid storage section 1 can be decreased. Due to the foregoing, the inner pressure in the liquid storage section 1 can be maintained at the atmospheric pressure thereby suppressing a reduction in the pressure in the liquid storage section 1 caused when the reacting solution is supplied from the liquid storage section to the reacting section 2.

Actually, 4 mL of an acid solution was accommodated in the liquid storage section 1 and 1 g of sodium boron hydride was accommodated in the reacting section 2, and the fuel cell was driven. Then, a volume of supply of the acid solution to the reacting section 2 was automatically adjusted, and the generation of electric power was continued until all the acid solution in the liquid storage section 1 was moved to the reacting section 2. In this case, the period of time of electric power generation was 10.6 hours at the constant current 0.5 A, and the electric current generating efficiency with respect to the theoretical value was 94%. Due to the foregoing, the following was made clear. By this structure, a volume of supply of the reacting solution is automatically controlled according to the output of the fuel cell, and the reacting solution can be highly effectively used for generating electric power.

Embodiment 7

Figure 8:
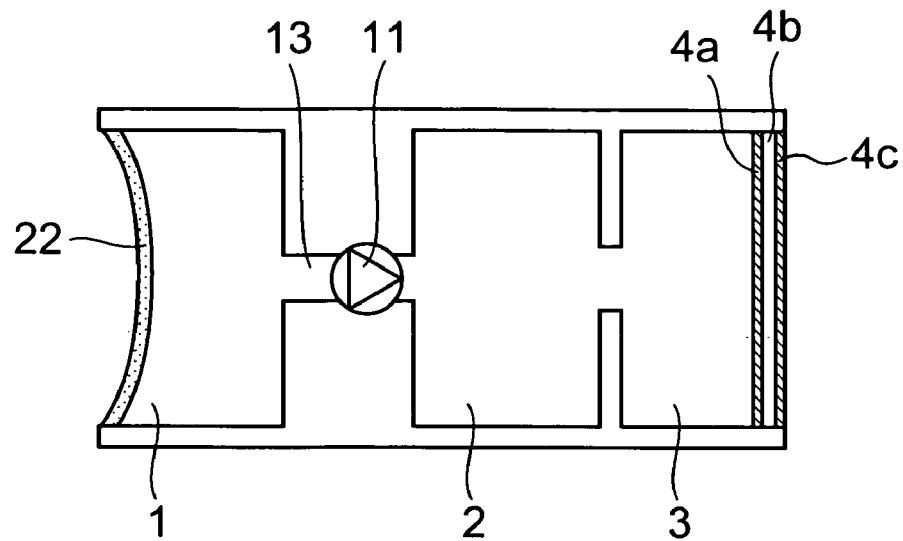
FIG. 8 is an arrangement view showing a case in which a movable wall is used for a pressure adjusting device of a liquid storage section of a fuel cell system of the present invention.

FIG. 8 is an arrangement view showing a case in which a movable wall is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device is the second movable wall 22 which is composed of an elastic body and attached to the liquid storage section 1. When the reacting solution is moved from the liquid storage section 1 to the reacting section 2, the inner pressure in the liquid storage section 1 is lowered. Therefore, a differential pressure is generated between the atmospheric pressure and the inner pressure in the liquid storage section 1. Accordingly, the second movable wall 22 is deflected by the differential pressure to the side on which a volume of the liquid storage section 1 can be decreased. Due to the foregoing, the inner pressure in the liquid storage section 1 can be maintained at the atmospheric pressure.

Embodiment 8

Figure 9:
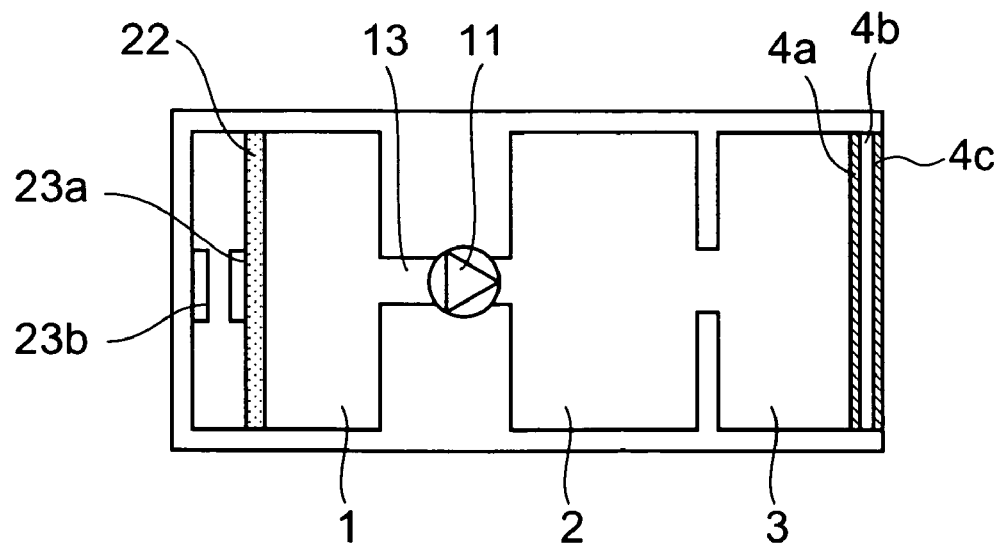
FIG. 9 is an arrangement view showing a case in which a magnet is used for a pressure adjusting device of a liquid storage section of a fuel cell system of the present invention.

FIG. 9 is an arrangement view showing a case in which a magnet is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device is composed in such a manner that the second movable wall 22 attached to the liquid storage section 1 is moved by a magnet. The detail are described below. First, the magnet 23a is arranged on a face of the second movable wall 22 opposing to the liquid storage section 1. The magnet 23b is arranged in a stationary portion opposing to the magnet 23a. Therefore, the magnets 23a and 23b repulse each other. As a result, although the inner pressure in the liquid storage section 1 is lowered when the reacting solution is moved from the liquid storage section 1 to the reacting section 2, the second movable wall 22 is given a repulsion force generated by the magnets 23a, 23b. Therefore, the second movable wall 22 is moved to the side on which the volume of the liquid storage section 1 can be reduced. Due to the foregoing, the inner pressure in the liquid storage section 1 can be maintained to be the same as the magnetic repulsion force.

According to this structure, electric power was generated by the fuel cell while the magnetic repulsion condition was made to be the same as the condition of Embodiment 1. The result of this embodiment was the same as the result of Embodiment 1. Accordingly, it was confirmed that the magnet was effectively used for the pressure adjusting device.

Embodiment 9

Figure 10:
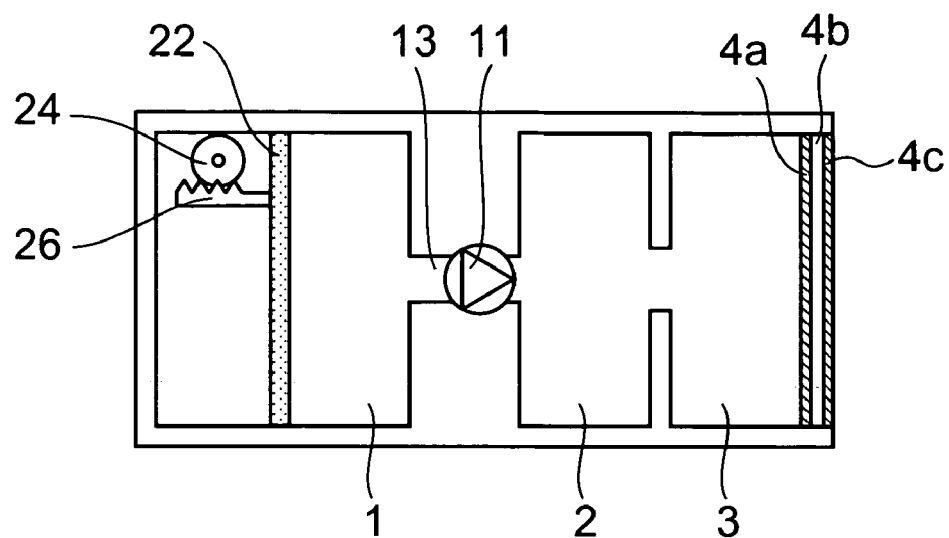
FIG. 10 is an arrangement view showing a case in which a motor is used for a pressure adjusting device of a liquid storage section of a fuel cell system of the present invention.

FIG. 10 is an arrangement view showing a case in which a motor is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device was the second movable wall 22 which was attached to the liquid storage section 1 and moved by a motor. To be in more detail, first, the motor 24 was arranged in a stationary portion in the periphery of the second movable wall 22. The slider 26 was attached to the second movable wall 22. A rotary motion of the motor 24 was converted into a linear motion by the slider 26, so that the second movable wall 22 could be pushed and the inner pressure in the liquid storage section 1 could be increased.

Embodiment 10

Figure 11:
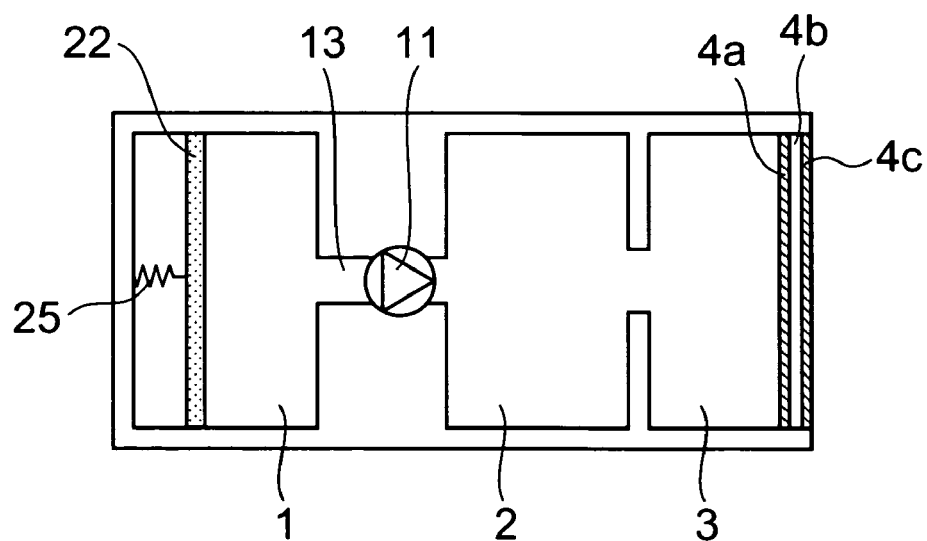
FIG. 11 is an arrangement view showing a case in which a spring is used for a pressure adjusting device of a liquid storage section of a fuel cell system of the present invention.

FIG. 11 is an arrangement view showing a case in which a spring is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the pressure adjusting device was the second movable wall 22 which was attached to the liquid storage section 1 and pushed by a spring. To be in more detail, first, one end portion of the spring 25 is arranged on the face of the second movable wall 22 opposing to the liquid storage section 1. The other end portion of the spring 25 is arranged in a stationary portion located at a position opposing to this. Due to this structure, the second movable wall 22 is pushed by the spring 25. As a result, although the inner pressure in the liquid storage section 1 is lowered when the reacting solution is moved from the liquid storage section 1 to the reacting section 2, the second movable wall 22 is given a force by the spring 25 and moved to the side on which a volume of the liquid storage section 1 can be reduced. Due to the foregoing, the inner pressure in the liquid storage section 1 can be maintained at the same pressure as that of the spring load.

In this case in which the spring 25 is used, according to the Hooke's law, the deflection and the pushing force are correlated to each other. Therefore, it is difficult to obtain a constant pushing force. However, as long as all the movement of the second movable wall 22 is in a range in which the Hooke's law can be applied, the spring 25 can sufficiently exhibit its function. In this embodiment, electric power was generated by the fuel cell under the same reacting condition as that of Embodiment 1. The result of this embodiment was the same as that of Embodiment 1. Therefore, it was confirmed that the spring was effectively used as the pressure adjusting device.

Embodiment 11

Figure 12:
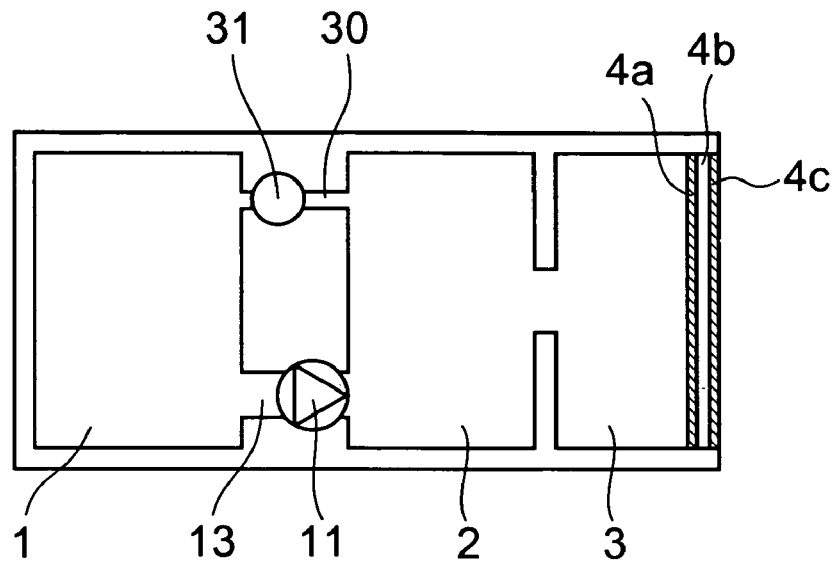
FIG. 12 is an arrangement view showing a case in which a gas passage is used for a pressure adjusting device of a liquid storage section of a fuel cell system of the present invention.

FIG. 12 is an arrangement view showing a case in which a gas passage is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the gas passage 30 was provided so that hydrogen could be moved from the reacting section 2 to the liquid storage section 1. The pressure reducing device 31 was arranged in the gas passage 30 so that the pressure of hydrogen moving to the liquid storage section 1 could be adjusted at 0.1 MPa. The action of this device will be explained below. In this case, an aqueous solution of methanol 30 wt % was used as the reacting solution. Although not shown in the drawing, in the reacting section 2, a copper catalyst and a heater for vaporizing the aqueous solution of methanol were attached to a passage in which the aqueous solution of methanol flowed.

First, the aqueous solution of methanol was supplied to the reacting section 2 and hydrogen was generated. At this time, the pressure in the reacting section 2 was raised. On the contrary, the inner pressure in the liquid storage section 1 was reduced due to the movement of the aqueous solution of methanol. Therefore, hydrogen was supplied from the reacting section 2 to the liquid storage section 1 through the gas passage 30 to suppress a reduction in the pressure in the liquid storage section 1. Since the pressure reducing device 31 is arranged in the gas passage 30, the supply of hydrogen to the liquid storage section 1 stops when the inner pressure in the liquid storage section 1 reached 0.1 MPa.

Next, when hydrogen was consumed by the fuel cell and the inner pressure in the reacting section 2 was decreased to a value lower then 0.1 MPa, the aqueous solution of methanol was supplied to the reacting section 2 through the liquid supply passage 13. After that, the above operation was repeatedly conducted. It was confirmed that a volume of supply of the reacting solution was automatically controlled in this structure and the fuel cell was continuously operated as described above.

Embodiment 12

Figure 13:
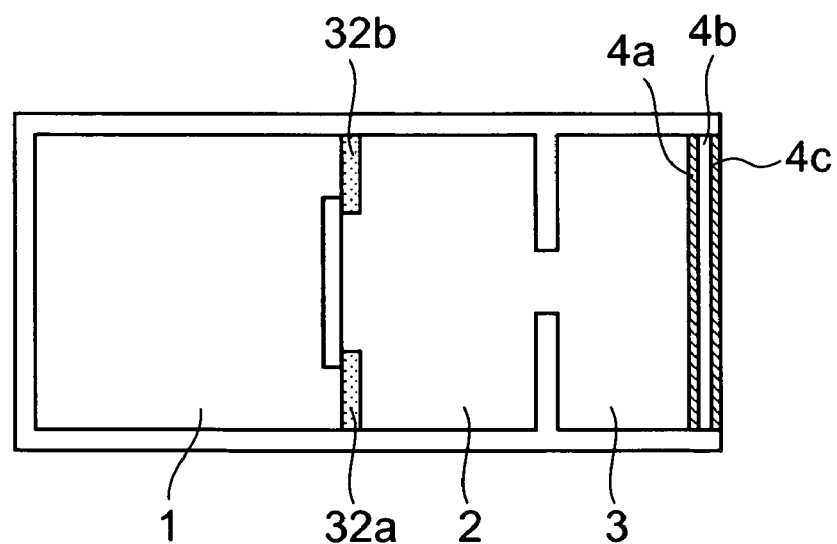
FIG. 13 is an arrangement view showing a case in which a gas passage is used for a pressure adjusting device of a liquid storage section of a fuel cell system of the present invention.

FIG. 13 is an arrangement view showing a case in which a gas passage is used for the pressure adjusting device of the liquid storage section of the fuel cell system of the present invention. The constitution and function of the liquid storage section 1, the reacting section 2, the gas storage section 3 and the fuel cell are the same as those of Embodiment 1.

In this embodiment, the liquid passage between the liquid storage section 1 and the reacting section 2 was composed of a liquid transmitting film 32$a$, and the gas passage 30 was composed of a gas transmitting film 32$b$. Since a pressure loss caused by the gas transmitting film 32$b$ was big, the gas transmitting film 32$b$ functioned in the same manner as the pressure reducing device 31 of Embodiment 11. Therefore, it was confirmed that the same effect as that of Embodiment 11 was provided by this structure.

Embodiment 13

Figure 14:
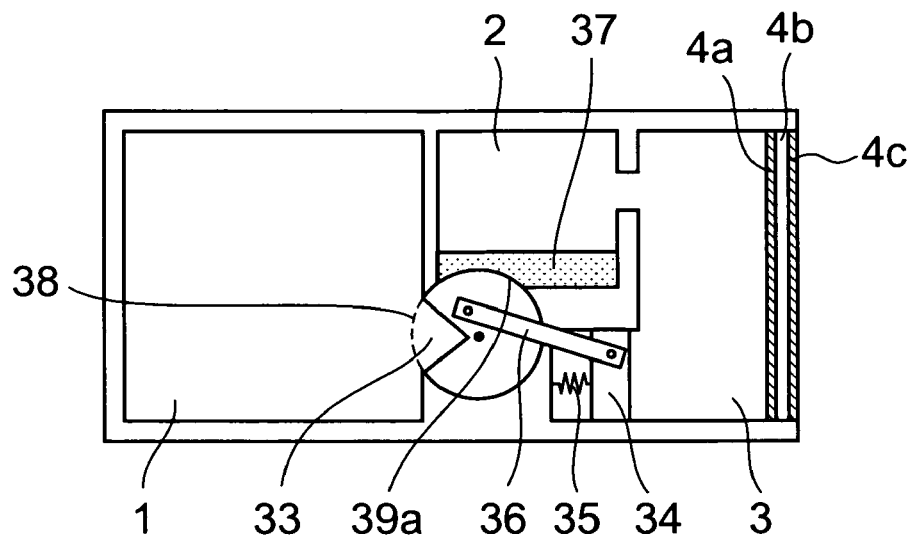
FIG. 14 is an arrangement view showing a case in which a volume of the reacting solution is controlled by a change in pressure in a gas storage section of a fuel cell system of the present invention.
Figure 14:
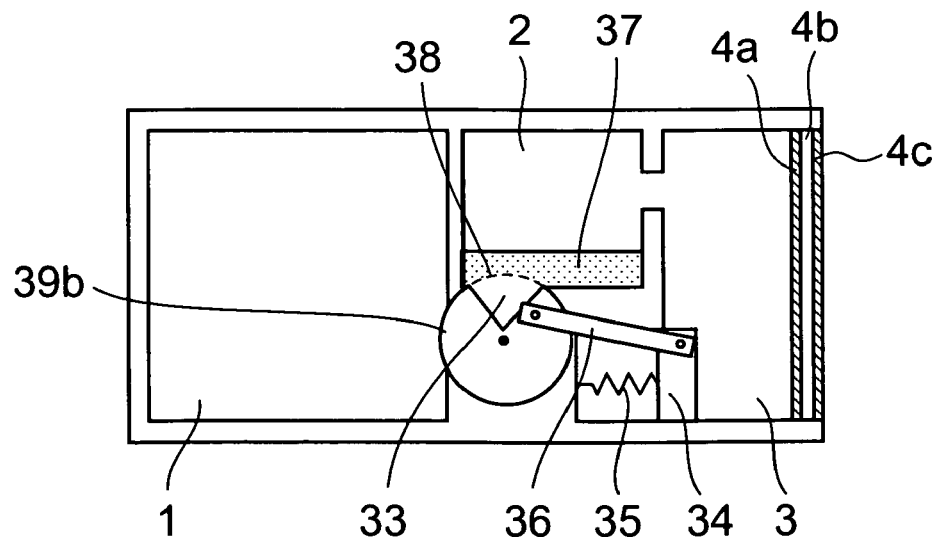

FIGS. 14($a$) and 14($b$) are arrangement views showing a case in which a volume of the reacting solution is controlled by a change in the pressure in the gas storage section of the fuel cell system of the present invention. FIG. 14($a$) is a view showing a state in which the reacting solution movement is stopped, and FIG. 14($b$) is a view showing a state in which the reacting solution is moved to the reacting section. The liquid storage section 1 is a portion in which the reacting solution for generating hydrogen is stored. After the reacting solution has been temporarily accommodated in the accommodating section 33, it is supplied to the reacting section 2. The reacting portion 2 is provided with a reactant capable of generating hydrogen when the reactant comes into contact with the reacting solution. Therefore, when the reacting solution is supplied to the reacting section 2, hydrogen is generated in the reacting section 2. The thus generated hydrogen is supplied to the gas storage section 3. The gas storage section 3 is a portion in which the hydrogen supplied from the reacting section 2 is temporarily stored. The fuel cell includes an anode 4$a$, a solid high molecular electrolyte film 4$b$ and a cathode 4$c$. Hydrogen in the gas storage section 3 is electrochemically oxidized by the anode 4$a$ and electricity is generated.

This embodiment includes an accommodating section moving mechanism for moving the accommodating section 33. The accommodating section moving mechanism was composed of a third movable wall 34. One face of the third movable wall 34 was pushed by the pressure of the gas storage section 3, and the other face of the third movable wall 34 was pushed by the pressurizing means 35. In this embodiment, the pressurizing means 35 was composed a spring. In order to link the third movable wall 34 with the accommodating section 33, the connecting section 36 was attached to both the third movable wall 34 and the accommodating section 33. Further, in this case, when the third movable wall 34 was moved in a cylindrical container, hydrogen was prevented from leaking out from the gas storage section 3.

In order to facilitate a movement of the reacting solution into the reacting section 2, the porous member 37 was arranged in a portion to which the opening portion 38 of the accommodating section 33 in the reacting section 2 was open. The porous member 37 sucks up the reacting solution from the accommodating section 33 by the capillary phenomenon.

Next, the action of the mechanism of moving the reacting solution will be explained below. First, in the case where a sufficiently large volume of hydrogen exists in the gas storage section 3 and the inner pressure is high, the third movable wall 34 is pushed onto the pressurizing means 35 side, and the position of the opening portion 38 of the accommodating section 33 coincides with the liquid storage section 1 by the action of the connecting section 36 corresponding to the position of the third wall 34. The shut-off section 39$a$ shuts off the accommodating section 33 from the reacting section 2. Accordingly, the reacting solution enters the accommodating section 33 and is accommodated.

Next, when hydrogen is consumed by the anode 4$a$ of the fuel cell and the inner pressure in the gas storage section 3 is decreased to a value lower than the pressure given by the pressurizing means 35, the third movable wall 34 is pushed to the gas storage section 3 side. Accordingly, the accommodating section 33 is moved by the action of the connecting section 36, and the position of the opening portion 38 agrees with the reacting section 2. The shut-off section 39$b$ shuts off the accommodating section 33 from the liquid storage section 1. Due to the foregoing, first, the reacting solution in the accommodating section 33 soaks into the porous member 37 in the reacting section 2. Therefore, the reacting solution can be moved from the accommodating section 33 into the reacting section 2.

In this embodiment, an aqueous solution of sodium hydride was used as the reacting solution, and zinc particulates were provided in the reacting section. Although not shown in the drawing, since both react intensely to each other, a hydrogen transmitting film was arranged between the reacting section 2 and the gas storage section 3 so that the reacting product could not be moved to the gas storage section 3. Since the hydrogen transmitting film was arranged between the reacting section 2 and the gas storage section 3, the inner pressure responding properties of the reacting section 2 and the gas storage section 3 were not good. However, in the case where hydrogen in the gas storage section 2 was consumed and the inner pressure was lowered, the accommodating section 33 was moved being linked with the third bulkhead 34 and an aqueous solution of sodium hydroxide was supplied to the reacting section 2. As a result, hydrogen was generated in the reacting section 2, and it was confirmed that the hydrogen pressure was raised in the gas storage section 3 and the fuel cell was continuously operated.

Embodiment 14

Figure 15:
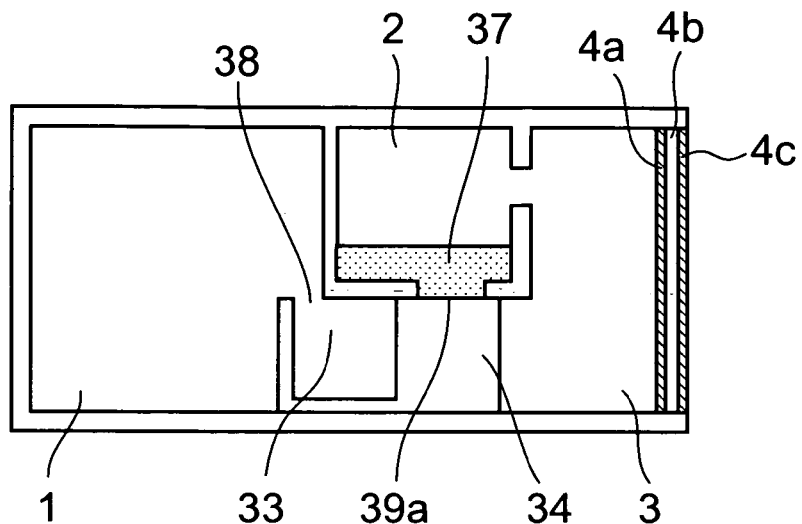
FIG. 15 is an arrangement view showing a case in which a volume of the reacting solution is controlled by a change in pressure in a gas storage section of a fuel cell system of the present invention.
Figure 15:
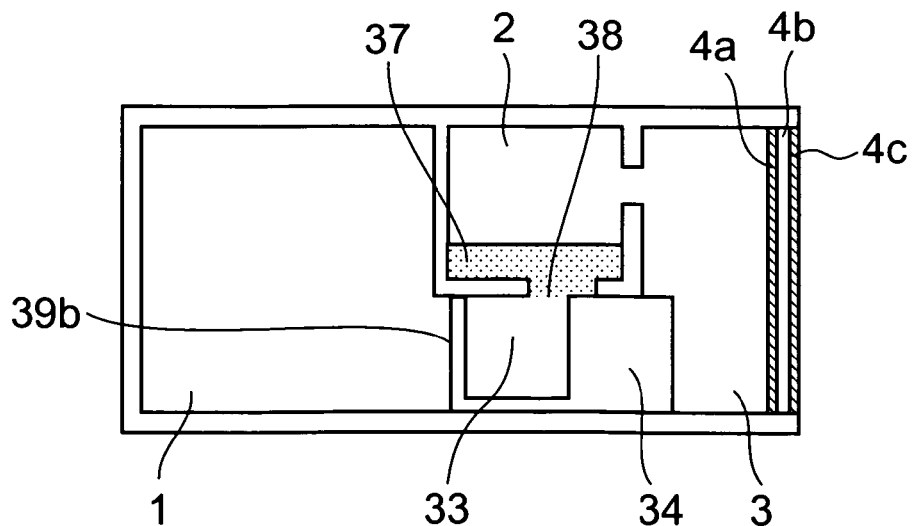

FIGS. 15($a$) and 15($b$) are arrangement views showing a case in which a volume of the reacting solution is controlled by a change in the pressure in the gas storage section of the fuel cell system of the present invention. FIG. 15($a$) is a view showing a state in which there acting solution movement is stopped, and FIG. 15($b$) is a view showing a state in which the reacting solution is moved to the reacting section. The constitution and function of the liquid storage section 1, the reacting section 2, the gas storage section 3 and the electric power generating section are the same as those of Embodiment 13. In this connection, in this embodiment, the third movable wall 34 is moved in a cylinder connecting the liquid storage section 1 with the gas storage section 3. The third movable wall 34 and the accommodating section 33 are integrated with each other into one body.

The accommodating section 33 has an opening portion 38. A position of the opening portion 38 coincides with the liquid storage section 1 or the reacting section 2, and the reacting solution is sent to or received from these two portions through the opening portion 38. To be in more detail, when the inner pressure in the gas storage section 3 is higher than the inner pressure in the liquid storage section 1, the third movable wall 34 and the accommodating section 33 are pushed to the liquid storage section 1 side, and the position of the opening portion 38 coincides with the liquid storage section 1. The shut-off section 39a shuts off the accommodating section 33 from the reacting section 2. Accordingly, the reacting solution is accommodated in the accommodating section 33. On the other hand, when hydrogen is consumed and the inner pressure in the gas storage section 3 is decreased to a value lower than the inner pressure in the liquid storage section 1, the third movable wall 34 is moved to the gas storage section 3 side. Accordingly, the accommodating section 33 is shut off from the liquid storage section 1 by the shut-off section 39b, and the reacting section 2 and the opening portion 38 face each other. In the reacting section 2, the porous member 37 for facilitating a movement of the reacting solution is arranged. Accordingly, it becomes possible to move the reacting solution from the accommodating section 33 to the reacting section 2.

In this embodiment, in the same manner as that of Embodiment 13, it was evaluated by using an aqueous solution of sodium hydroxide and zinc whether or not the reacting solution could be continuously moved and the fuel cell could be continuously operated. As a result, it was confirmed that the reacting solution was automatically moved and the fuel cell was continuously operated.

Embodiment 15

Figure 16:
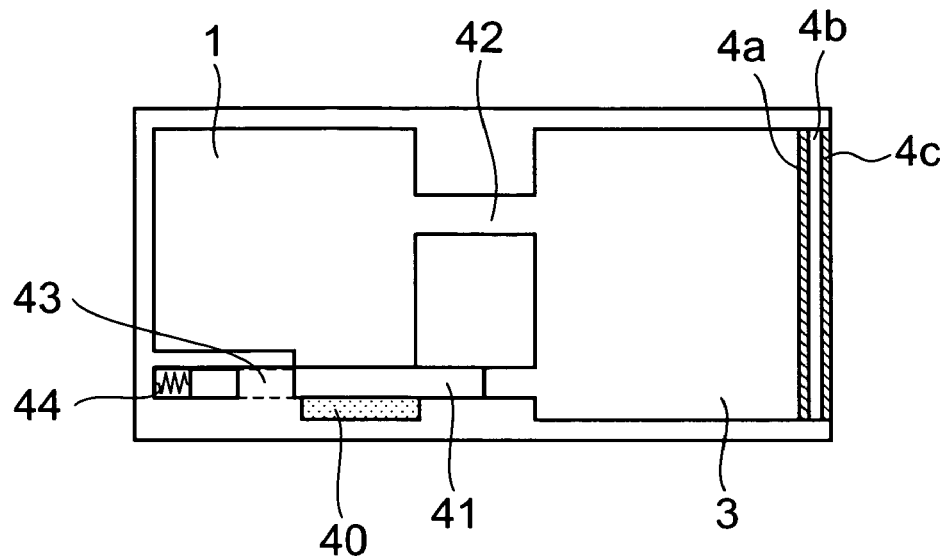
FIG. 16 is an arrangement view showing a case in which a volume of the generated gas is controlled when an area of a reacting portion of a fuel cell system of the present invention is made variable.
Figure 16:
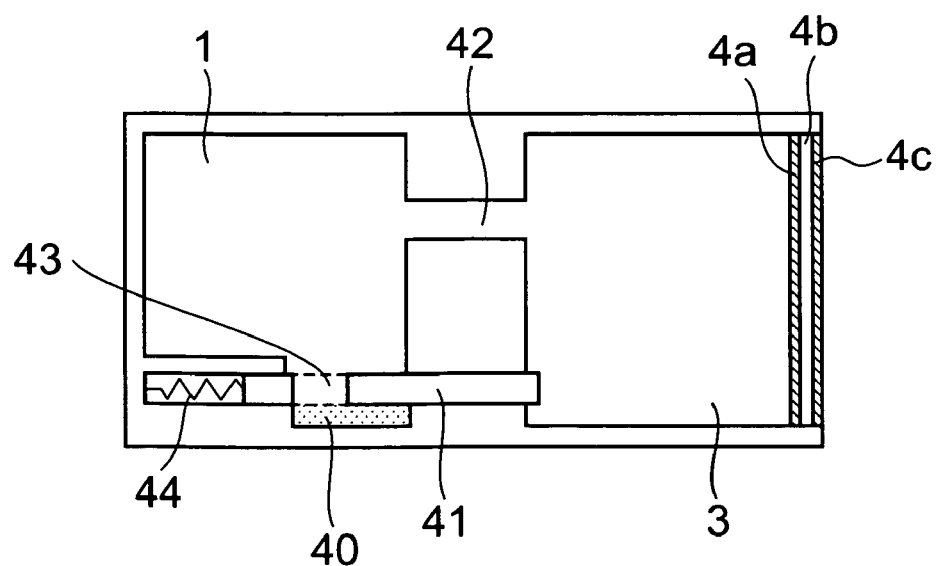

FIG. 16 is an arrangement view showing a case in which a volume of generation of the reacting gas is controlled when an area of the reacting portion of the fuel cell system is made to be variable. FIG. 16(a) is a view showing a state in which the reaction of generating hydrogen is stopped, and FIG. 16(b) is a view showing a state in which hydrogen is generated. The fuel cell includes an anode 4a, a solid high molecular electrolyte film 4b and a cathode 4c. Hydrogen accommodated in the gas storage section 3 is electrochemically oxidized by the anode 4a so that electric power can be generated. The liquid storage section 1 is a portion for storing the reacting solution to generate hydrogen. The gas storage section 3 is a portion for temporarily storing hydrogen so that the stored hydrogen can be sent to the anode 4a. The reacting member 40 is arranged on a bottom face of the liquid storage section 1. When the reacting member 40 comes into contact with there acting solution, hydrogen is generated. In order to make a contact area of the reacting solution with the reacting member 40 variable, the movable bulkhead 41 is arranged in an upper portion of the reacting member 40. The bulkhead 41 is provided with a through-hole 43 so that the reacting member 40 and the reacting solution can be contacted with each other so as to generate hydrogen. Further, the connecting pipe 42 is arranged which is used for supplying hydrogen, which is generated in the liquid storage section 1, to the gas storage section 3.

The bulkhead 41 is slid by a differential pressure between the pressure in the gas storage section 3 and the pressure in the pressurizing device 44. That is, when a sufficiently large volume of hydrogen exists in the gas storage section 3 and the inner pressure is high, the through-hole 43 of the bulkhead 41 is located at the position where it is not contacted with the reacting member 40. However, when hydrogen in the gas storage section 3 is consumed and the inner pressure in the gas storage section 3 is decreased to a value lower then the pressure of the pressurizing device 44, the bulkhead 41 is moved and the position of the through-hole 43 overlaps the reacting member 40, and the reacting solution is supplied to the reacting member 40 through the through-hole 43 and hydrogen is generated.

In this embodiment, magnesium was used for the reacting member 40, and an aqueous solution of sulfuric acid was used for the reacting solution. It was confirmed that the position of the reacting member 40 was changed according to the output of the fuel cell and the hydrogen generating reaction and that the advance and stoppage of the hydrogen generating reaction were automatically repeated.

Embodiment 16

Figure 17:
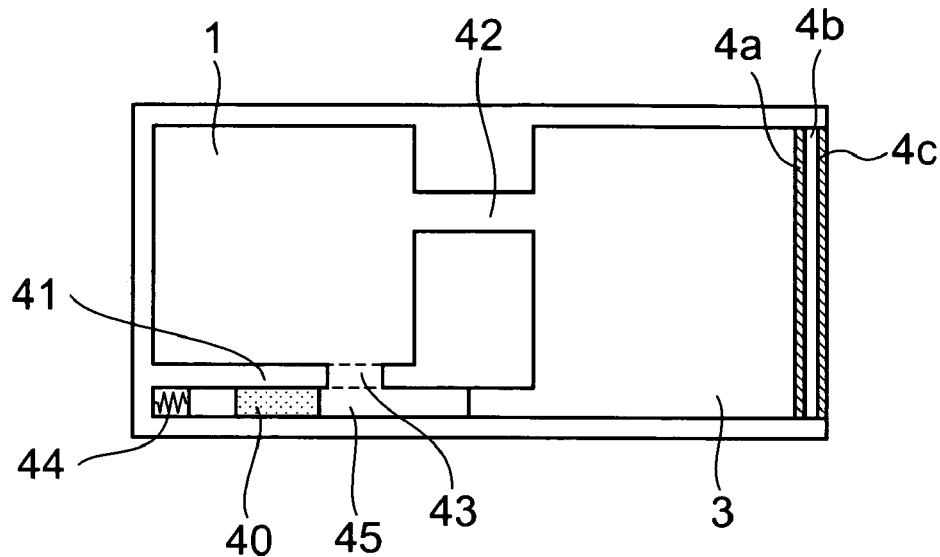
FIG. 17 is an arrangement view showing a case in which a volume of the generated gas is controlled when an area of a reacting portion of a fuel cell system of the present invention is made variable.
Figure 17:
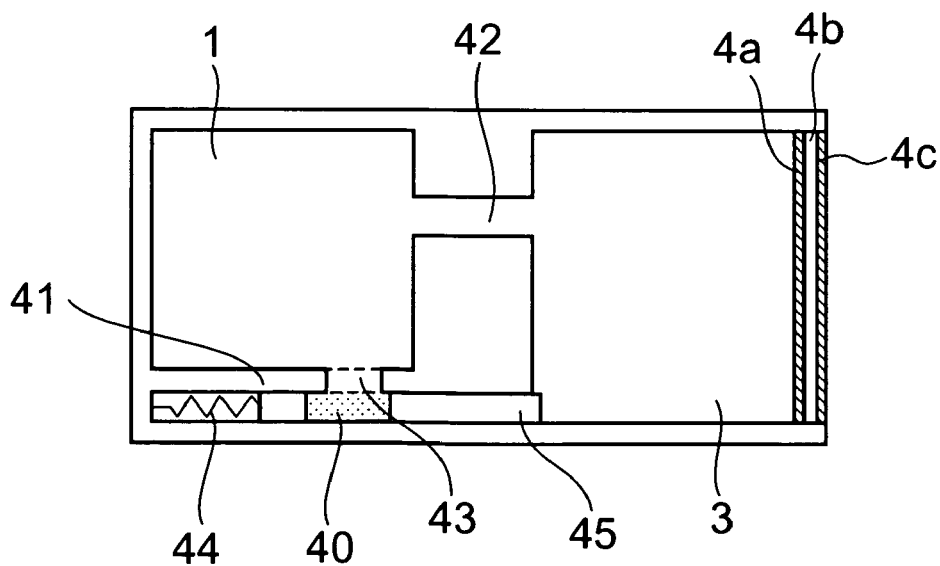

FIG. 17 is an arrangement view showing a case in which a volume of generation of the reacting gas is controlled when an area of the reacting portion of the fuel cell system is made to be variable. FIG. 17(a) is a view showing a state in which the reaction of generating hydrogen is stopped, and FIG. 17(b) is a view showing a state in which hydrogen is generated. The constitution and function of the liquid storage section 1, the reacting section 2, the gas storage section 3 and the electric power generating section are the same as those of Embodiment 15. In this connection, in this embodiment, the bulkhead 41 is a stationary member, and the reacting member 40 is moved. In portions of the reacting member 40 coming into contact with the pressurizing member 44 and the gas storage member 3, the non-reacting member 45, which causes no reaction, is provided. In the same manner as that of Embodiment 15, in the case where the reacting member 40 moves and the position of the reacting member 40 coincides with the position of the through-hole 43, hydrogen can be generated. The reacting member 40 is moved by the pressure of hydrogen in the gas storage section 3. Therefore, this movement of the reacting member 40 corresponds to the state of operation of the fuel cell.

In this embodiment, an aqueous solution of sodium boron hydride was used for the reacting solution, and nickel mesh, which bore a ruthenium catalyst, was used for the reacting member 40. It was confirmed that the position of the reacting member 40 was changed according to the output of the fuel cell and the hydrogen generation and that the advance and stoppage of the hydrogen generating reaction was automatically repeated.

Embodiment 17

Figure 18:
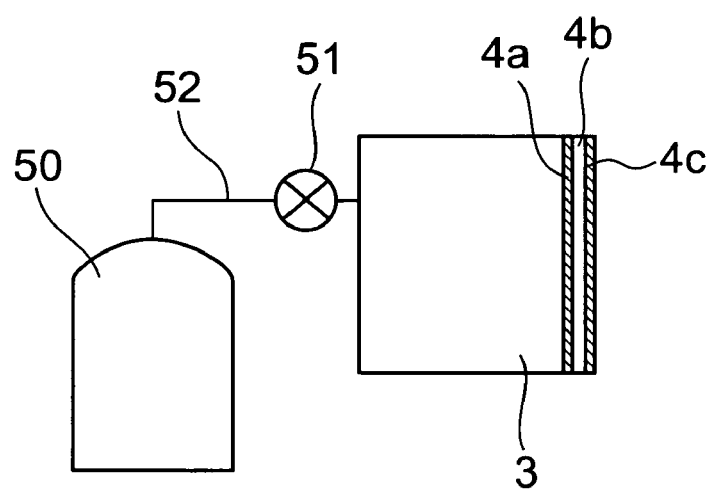
FIG. 18 is an arrangement view showing a case in which a gas storage tank is used for a fuel cell system of the present invention.

FIG. 18 is an arrangement view showing a case in which a gas storage tank of the fuel cell system of the present invention is used. Hydrogen is sent from the storage tank 50 to the gas storage section 3 when hydrogen passes in the gas pipe 52 connected to the storage tank 50 and further hydrogen passes in the pressure reducing means 51. After that, the hydrogen is once stored in the gas storage section 3 and then sent to the anode 4a of the fuel cell and used for generating electric power. At this time, the hydrogen is used only for the fuel cell reaction and the hydrogen is not leaked outside the fuel cell system. Accordingly, the inner pressure in the gas storage section 3 is a factor determined by the hydrogen consumption by the fuel cell and the hydrogen supply from the pressure reducing means 51.

Specifically, a regulator was used for the pressure reducing means 51, and the pressure of hydrogen to be outputted was adjusted at 0.1 MPa. When the inner pressure in the gas storage section 3 was decreased to a value lower than 0.1 MPa by the operation of the fuel cell, hydrogen was supplied by the action of the regulator and the pressure was adjusted at 0.1 MPa. Due to the foregoing, it was made clear that the condition of stably operating the fuel cell by automatically adjusting the hydrogen pressure without consuming electric power was created.

As explained above, according to the fuel cell of the present invention, a volume of supply of the reacting solution can be controlled in accordance with a state of driving the fuel cell without directly detecting an output of electric power of the fuel cell. Therefore, it becomes unnecessary to provide electronic parts and conduct electrical processing relating to control. Accordingly, the energy consumption can be reduced. When the number of parts is decreased, the fuel cell can be reduced in weight. At the same time, the manufacturing cost can be reduced.

The invention claimed is:

1. A fuel cell system comprising:
a liquid storage section for storing a reacting solution;
a reacting section for generating reacting gas from the reacting solution supplied from the liquid storage section;
a gas storage section for storing the reacting gas supplied from the reacting section;
a fuel cell for generating electricity while the reacting gas supplied from the gas storage section is being used as fuel, the fuel cell having an electrode connected to a solid high molecular electrolyte film;
means for supplying the reacting solution from the liquid storage section to the reacting section when the pressure in the liquid storage section is higher than the pressure in the reacting section and for stopping the supply of the reacting solution when the pressure in the liquid storage section is lower than the pressure in the reacting section; and
a pressure adjusting device that suppresses a reduction in the pressure in the liquid storage section caused when the reacting solution is supplied from the liquid storage section to the reacting section, the pressure adjusting device having a port through which air at atmospheric pressure is supplied into the liquid storage section, and a check valve for obstructing backward flow of the air from the liquid storage section through the port.

2. A fuel cell system according to claim 1; wherein the means comprises a check device for preventing flow of substances from the reacting section to the liquid storage section, the check device being disposed in a liquid supply passage that supplies the reacting solution from the liquid storage section to the reacting section.

3. A fuel cell system according to claim 2; wherein the check device opens and closes the liquid supply passage.

4. A fuel cell system according to claim 2; wherein the check device comprises a check valve for preventing flow of substances from the reacting section to the liquid storage section.

5. A fuel cell system according to claim 2; wherein the check device comprises a movable wall disposed in the liquid supply passage between the liquid storage section and the reacting section; and wherein when the pressure in the reacting section is raised by generation of the reacting gas, the movable wall is moved by a force generated by the pressure in the reacting section in a direction so as to close the liquid supply passage; and wherein when the pressure in the reacting section is lowered by the consumption of the reacting gas, the movable wall is moved in a direction so as to open the liquid supply passage.

6. A fuel cell system according to claim 1; wherein the pressure adjusting device has a fan for supplying air from an exterior of the fuel cell.

7. A fuel cell system comprising:
a liquid storage section that stores a reacting solution;
a reaction section that generates reacting gas from the reacting solution supplied from the liquid storage section;
a gas storage section that stores the reacting gas supplied from the reaction section;
a fuel cell that generates electricity using the reacting gas supplied from the gas storage section as fuel;
means for supplying the reacting solution from the liquid storage section to the reaction section when the pressure in the liquid storage section is higher than the pressure in the reaction section and for stopping the supply of the reacting solution when the pressure in the liquid storage section is lower than the pressure in the reaction section; and
a pressure adjusting device that repeatedly admits air at atmospheric pressure into the liquid storage section whenever the pressure in the liquid storage section is lower than atmospheric pressure thereby suppressing a reduction in pressure in the liquid storage section occurring when the reacting solution is supplied from the liquid storage section to the reaction section.

8. A fuel cell system according to claim 7; wherein the fuel cell comprises a solid polymer membrane fuel cell having a solid polymer electrolyte membrane sandwiched between electrodes.

9. A fuel cell system according to claim 7; wherein the means includes a check device that permits flow of the reacting solution through a liquid supply path from the liquid storage section to the reaction section and that prevents flow of substances through the liquid supply passage from the reaction section to the liquid storage section.

10. A fuel cell system according to claim 9; wherein the check device comprises a check valve.

11. A fuel cell system according to claim 9; wherein the check device comprises a movable wall movable to open and close the liquid supply passage, and a pressure-responsive member movable in response to a pressure differential between the pressure in the liquid storage section and the pressure in the reaction section to move the movable wall.

12. A fuel cell system according to claim 11; wherein the pressure-responsive member comprises a piston.

13. A fuel cell system comprising:
a liquid storage section for storing a reacting solution;
a reacting section for generating reacting gas from the reacting solution supplied from the liquid storage section;
a gas storage section for storing the reacting gas supplied from the reacting section;
a fuel cell for generating electricity while the reacting gas supplied from the gas storage section is being used as fuel, the fuel cell having an electrode connected to a solid high molecular electrolyte film;
means for supplying the reacting solution from the liquid storage section to the reacting section when the pressure in the liquid storage section is higher than the pressure in the reacting section and for stopping the supply of the reacting solution when the pressure in the liquid storage section is lower than the pressure in the reacting section; and
a pressure adjusting device configured to suppress a reduction in the pressure in the liquid storage section caused when the reacting solution is supplied from the liquid storage section to the reacting section, the pressure adjusting device comprising a movable wall of the liquid storage section that undergoes movement to adjust the pressure in the liquid storage section by a force from atmospheric pressure, a driving force of a motor, a magnetic force, or a force generated by a spring.

14. A fuel cell system according to claim 13; wherein an exterior surface of the movable wall communicates with the atmosphere so that atmospheric pressure applies the force to the movable wall.

15. A fuel cell system according to claim 14; wherein the movable wall comprises an elastic body.

16. A fuel cell system comprising;
a liquid storage section for storing a reacting solution;
a reacting section for generating reacting gas from the reacting solution supplied from the liquid storage section;
a gas storage section for storing the reacting gas supplied from the reacting section;
a fuel cell for generating electricity while the reacting gas supplied from the gas storage section is being used as fuel, the fuel cell having an electrode connected to an electrolyte film;
means for supplying the reacting solution from the liquid storage section to the reacting section when the pressure in the liquid storage section is higher than the pressure in the reacting section and for stopping the supply of the reacting solution when the pressure in the liquid storage section is lower than the pressure in the reacting section; and
a pressure adjusting device that suppresses a reduction in the pressure in the liquid storage section caused when the reacting solution is supplied from the liquid storage section to the reacting section, the pressure adjusting device comprising a gas passage through which the reacting gas flows from the reacting section to the liquid storage section, and a pressure reducing device disposed in the gas passage for reducing to a preselected pressure the pressure of the reacting gas flowing from the reacting section to the liquid storage section.

17. A fuel cell system according to claim 16; wherein the means includes a check device that permits flow of the reacting solution through a liquid supply path from the liquid storage section to the reacting section and that prevents flow of substances through the liquid supply passage from the reacting section to the liquid storage section.

18. A fuel cell system according to claim 16; further comprising a liquid supply passage through which the reacting solution is supplied from the liquid storage section to the reacting section, the diameter of the liquid supply passage being larger than the diameter of the gas passage.

19. A fuel cell system according to claim 16; wherein the liquid supply passage is hydrophilic.

20. A fuel cell system according to claim 16; wherein the gas passage is hydrophobic.

21. A fuel cell system according to claim 16; wherein each of the liquid supply passage and the gas passage is formed of one of a film or a porous member through which liquid or gas is transmitted.

22. A fuel cell system according to claim 17; wherein the check device comprises a check valve.

23. A fuel cell system according to claim 7; wherein the pressure adjusting device comprises an intake passage that communicates at one end with air at atmospheric pressure and at the other end with the liquid storage section, and a check valve disposed in the intake passage for admitting air into the liquid storage section and preventing backflow of air from the liquid storage section.

24. A fuel cell system according to claim 23; wherein the means includes a check device that permits flow of the reacting solution through a liquid supply path from the liquid storage section to the reaction section and that prevents flow of substances through the liquid supply passage from the reaction section to the liquid storage section.

25. A fuel cell system according to claim 24; wherein the check device comprises a check valve.

26. A fuel cell system according to claim 24; wherein the check device comprises a movable wall movable to open and close the liquid supply passage, and a pressure-responsive member movable in response to a pressure differential between the pressure in the liquid storage section and the pressure in the reaction section to move the movable wall.

27. A fuel cell system according to claim 26; wherein the pressure-responsive member comprises a piston.

* * * * *